(12) United States Patent
Matsumoto et al.

(10) Patent No.: US 7,573,647 B2
(45) Date of Patent: Aug. 11, 2009

(54) OPTICAL UNIT AND IMAGE CAPTURING APPARATUS INCLUDING THE SAME

(75) Inventors: Hiroyuki Matsumoto, Wakayama (JP); Yasushi Yamamoto, Kishiwada (JP); Atsuo Masui, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 470 days.

(21) Appl. No.: 11/435,634

(22) Filed: May 17, 2006

(65) Prior Publication Data

US 2006/0262421 A1    Nov. 23, 2006

(30) Foreign Application Priority Data

May 19, 2005    (JP) .............................. 2005-147229

(51) Int. Cl.
    *G02B 15/14* (2006.01)
(52) U.S. Cl. ........................ 359/676; 359/686; 359/689; 359/691; 359/740; 359/708; 359/715

(58) Field of Classification Search ......... 359/676–692; 396/351, 21, 72, 77, 79, 85, 87
See application file for complete search history.

(56) References Cited

U.S. PATENT DOCUMENTS

| | | | |
|---|---|---|---|
| 5,587,739 A | 12/1996 | Suzuki et al. | 348/347 |
| 6,606,202 B2 | 8/2003 | Hoshi | 359/687 |
| 7,180,682 B1 * | 2/2007 | Terada | 359/687 |
| 7,227,698 B2 * | 6/2007 | Yamamoto et al. | 359/687 |
| 7,446,947 B2 * | 11/2008 | Yamamoto et al. | 359/676 |

FOREIGN PATENT DOCUMENTS

| | | |
|---|---|---|
| JP | 08-032865 A | 2/1996 |
| JP | 08-223464 A | 8/1996 |
| JP | 2002-354320 A | 12/2002 |

* cited by examiner

*Primary Examiner*—Evelyn A. Lester
(74) *Attorney, Agent, or Firm*—Sidley Austin LLP

(57) ABSTRACT

In zooming, an optical unit moves the lens unit located at the most image side and the image sensor along the optical axis while not moving at least one lens unit, of a plurality of lens units, other than the lens unit located at the most image side.

12 Claims, 11 Drawing Sheets

FNO=3.40

—— d
---- SC

-0.1    0.1
SPHERICAL  SINE
ABERRATION CONDITION

Y'=4.4

---- DM
—— DS

-0.1    0.1
ASTIGMATISM

Y'=4.4

-5.0    5.0
DISTORTION

FNO=4.51

—— d
---- SC

-0.1    0.1
SPHERICAL  SINE
ABERRATION CONDITION

Y'=4.4

---- DM
—— DS

-0.1    0.1
ASTIGMATISM

Y'=4.4

-5.0    5.0
DISTORTION

FNO=5.78

—— d
---- SC

-0.1    0.1
SPHERICAL  SINE
ABERRATION CONDITION

Y'=4.4

---- DM
—— DS

-0.1    0.1
ASTIGMATISM

Y'=4.4

-5.0    5.0
DISTORTION

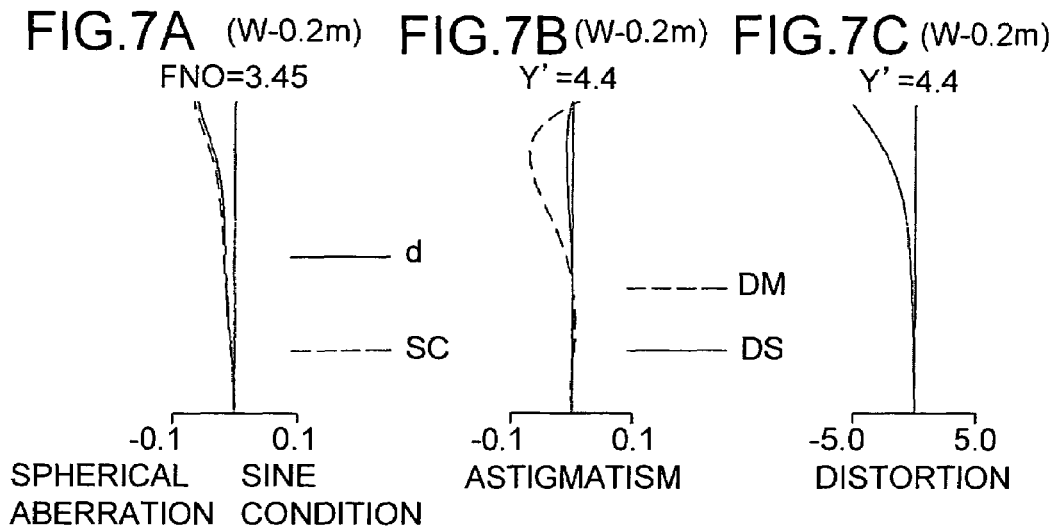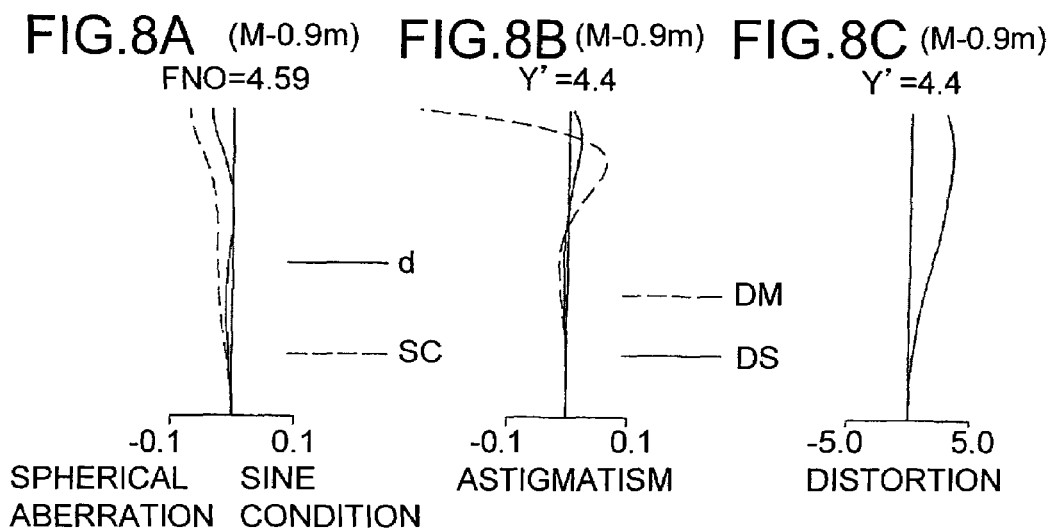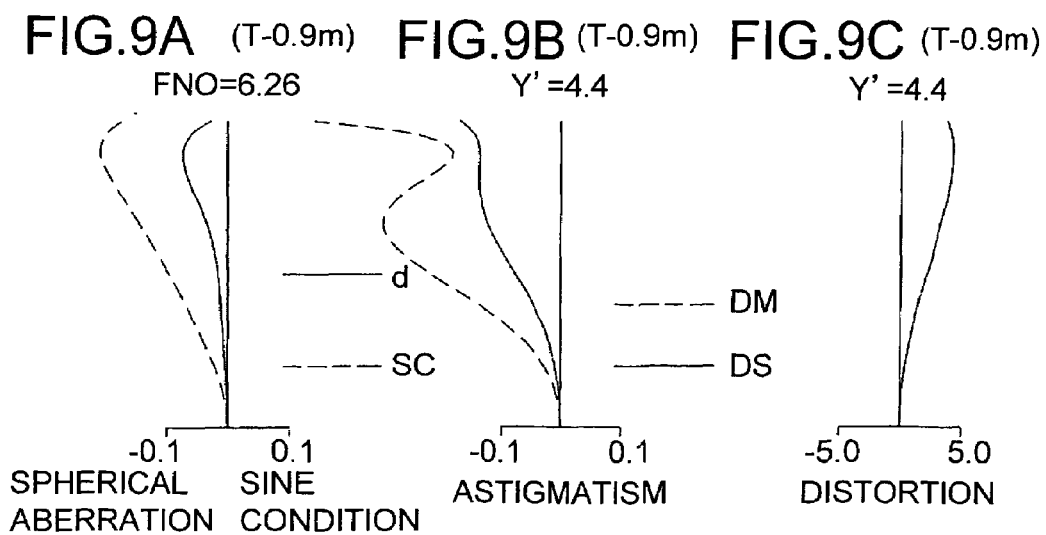

FNO=2.82

— d
---- SC

-0.1  0.1
SPHERICAL SINE
ABERRATION CONDITION

Y'=4.4

---- DM
— DS

-0.1  0.1
ASTIGMATISM

Y'=4.4

-5.0  5.0
DISTORTION

FNO=3.67

— d
---- SC

-0.1  0.1
SPHERICAL SINE
ABERRATION CONDITION

Y'=4.4

---- DM
— DS

-0.1  0.1
ASTIGMATISM

Y'=4.4

-5.0  5.0
DISTORTION

FNO=4.35

— d
---- SC

-0.1  0.1
SPHERICAL SINE
ABERRATION CONDITION

Y'=4.4

---- DM
— DS

-0.1  0.1
ASTIGMATISM

Y'=4.4

-5.0  5.0
DISTORTION

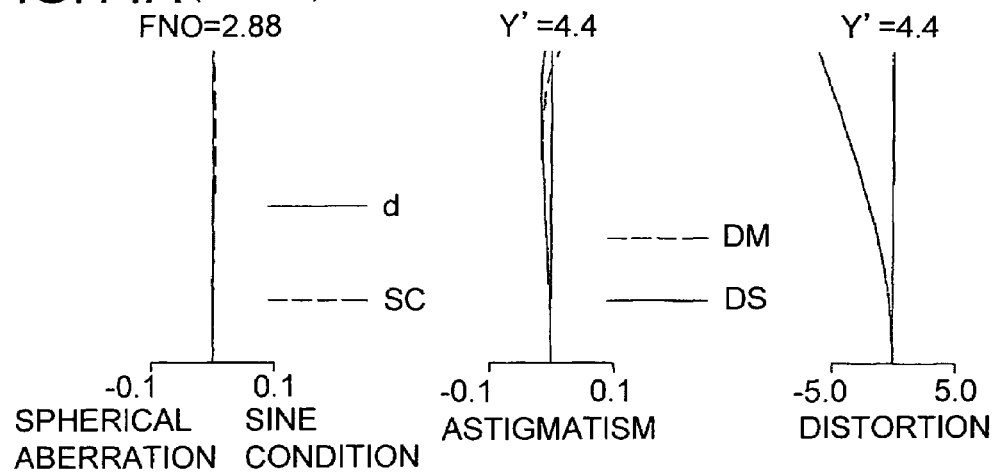
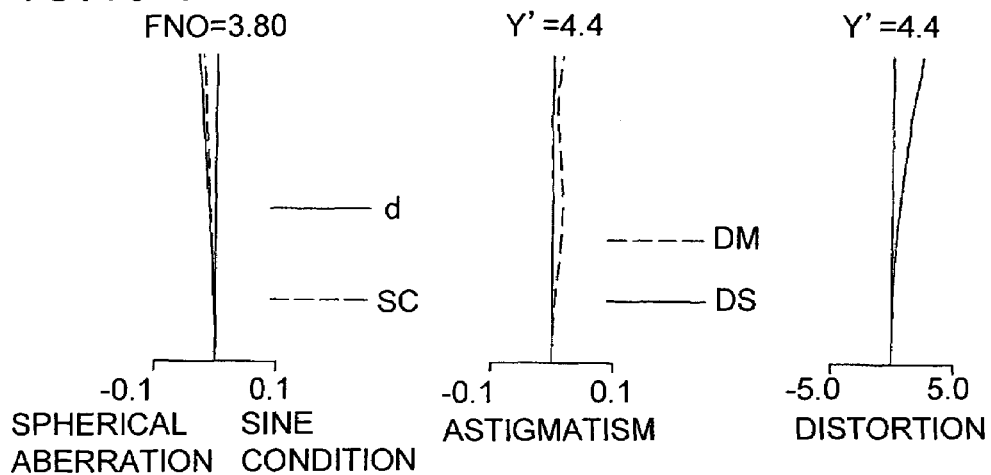
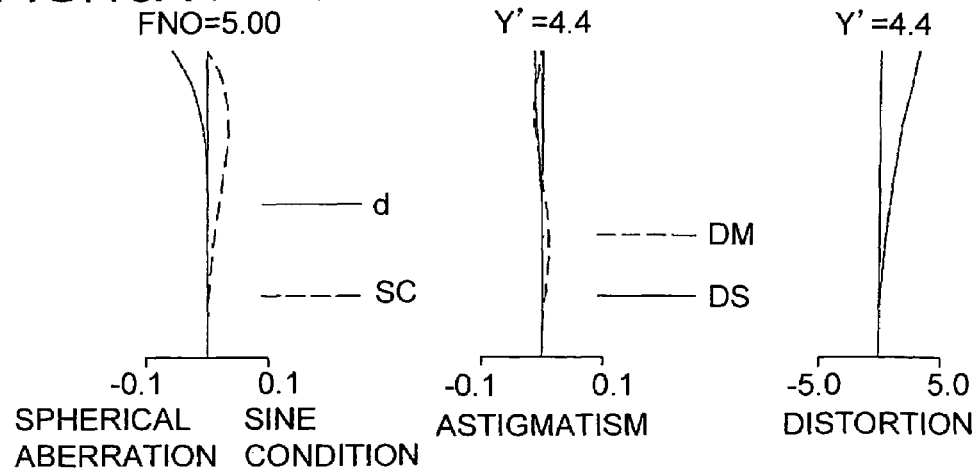

FNO=2.70
—— d
----- SC
-0.1   0.1
SPHERICAL SINE
ABERRATION CONDITION

Y'=4.4
----- DM
—— DS
-0.1   0.1
ASTIGMATISM

Y'=4.4
-5.0   5.0
DISTORTION

FNO=3.66
—— d
----- SC
-0.1   0.1
SPHERICAL SINE
ABERRATION CONDITION

Y'=4.4
----- DM
—— DS
-0.1   0.1
ASTIGMATISM

Y'=4.4
-5.0   5.0
DISTORTION

FNO=5.08
—— d
----- SC
-0.1   0.1
SPHERICAL SINE
ABERRATION CONDITION

Y'=4.4
----- DM
—— DS
-0.1   0.1
ASTIGMATISM

Y'=4.4
-5.0   5.0
DISTORTION

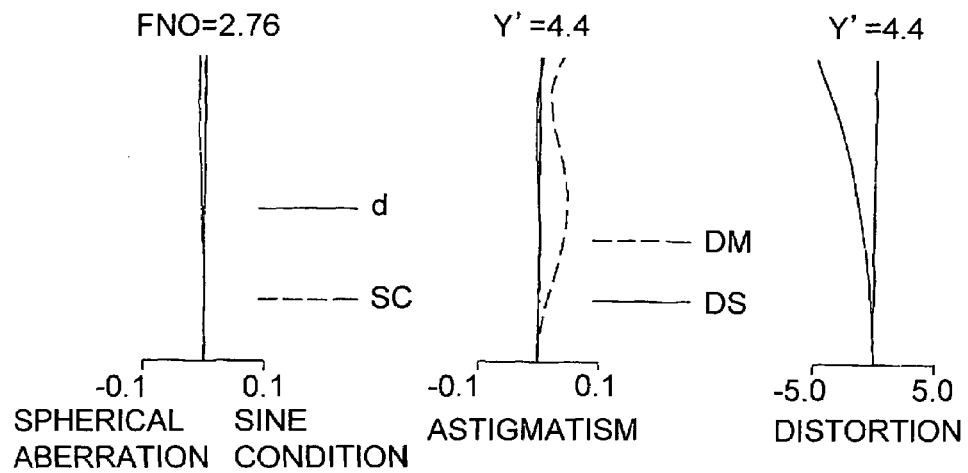
FIG.21A (W-0.2m), FIG.21B (W-0.2m), FIG.21C (W-0.2m)
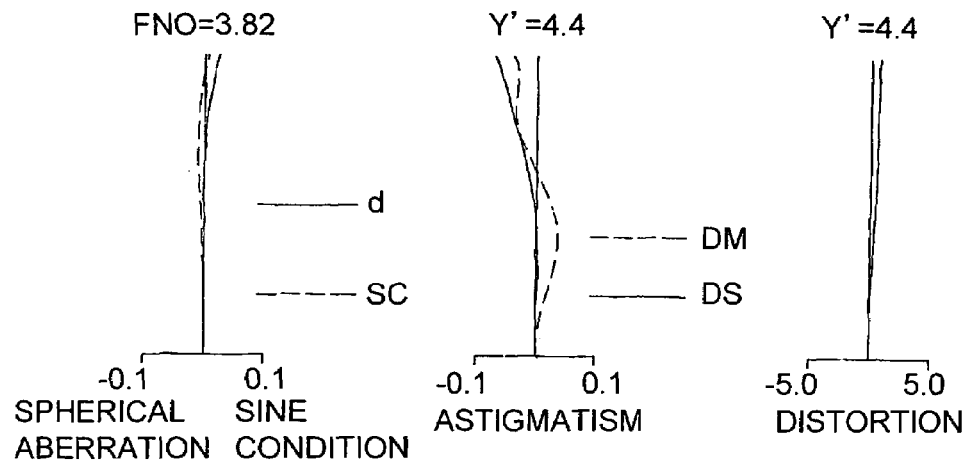
FIG.22A (M-0.2m), FIG.22B (M-0.2m), FIG.22C (M-0.2m)
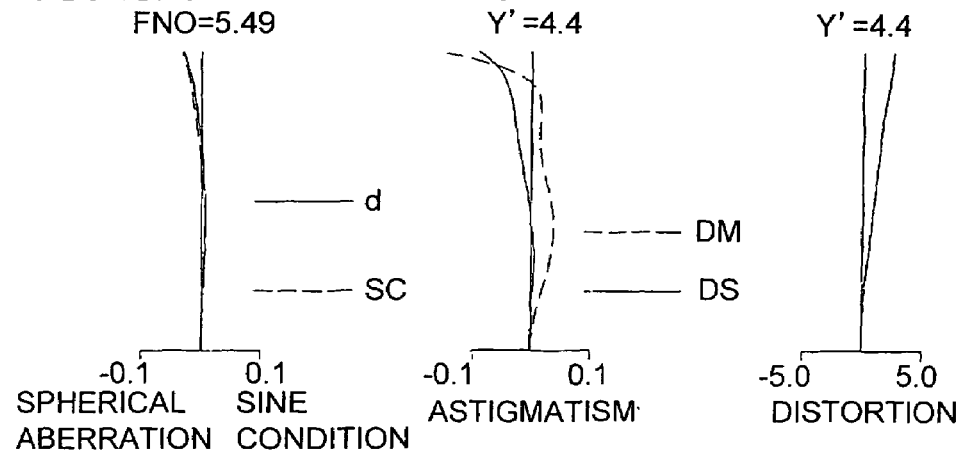
FIG.23A (T-0.2m), FIG.23B (T-0.2m), FIG.23C (T-0.2m)

OPTICAL UNIT AND IMAGE CAPTURING APPARATUS INCLUDING THE SAME

This application is based on Japanese Patent Application No. 2005-147229 filed on May 19, 2005, the contents of which are hereby incorporated by reference.

BACKGROUND OF THE INVENTION

1. Field of the Invention

The present invention relates to, for example, an optical unit including a variable magnification optical system and to an image capturing apparatus including this optical unit.

2. Description of the Prior Art

In recent years, digital cameras have been increasingly widespread which employ an image sensor, such as a CCD (charge coupled device) or the like, that converts an optical image into an electrical signal. As is the case with cameras employing a silver halide film, there has been a demand for such digital cameras to be miniaturized (downsized) and simplified in structure.

Many of optical systems capable of magnification variation (variable magnification optical systems) for use in a digital camera or the like have lens units provided with a positive, a negative, a positive, and a positive optical powers (refractive powers). In such a variable magnification optical system, in order to achieve a simplified structure, the first lens unit closest to the object side is not moved during magnification variation (zooming) or the like in some cases.

However, as is the case with a conventional variable magnification optical system (zoom lens), the immovability of the first lens unit is likely to result in an increase in the full length and the lens diameter (for example, front lens diameter) of the zoom lens. To control such a tendency, there is a magnification variation method of moving the first lens unit. However, although reducing the full length and the lens diameter of the zoom lens, this method leads to a complicated structure.

Thus, this conventional zoom lens adopts a method of not moving the first lens unit while moving the fourth lens unit closest to the image side to thereby achieve downsizing of the lens diameter and the like.

However, with only the magnification variation method of not moving the first lens unit while moving the fourth lens unit, there is a limit to the downsizing of the lens diameter and the like.

SUMMARY OF THE INVENTION

In view of such a condition, the invention has been made, and it is an object of the invention to provide an optical unit having in a lens unit thereof lens elements with downsized diameters (lens diameters) and a compact image capturing apparatus including this optical unit.

To achieve the object described above, according to one aspect of the invention, an optical unit includes: a variable magnification optical system including a plurality of lens units having at least the object side lens unit closest to the object side and the image side lens unit closest to the image side; an image sensor for receiving light that has passed through the variable magnification optical system; and a magnification variation structure in which, while, of the plurality of lens units, at least one of the lens units other than the image side lens unit is not moved, the image side lens unit and the image sensor are moved along the optical axis to thereby perform magnification variation.

As described above, magnification variation in which, while the image sensor moves, the lens unit provides the same effect as provided by magnification variation in which, while the image sensor does not move, the lens unit moves. This is because the fact that, while the image sensor does not move, the lens unit moves is relatively synonymous with (equivalent to) the fact that, while the image sensor moves, the lens unit does not move.

That is, the optical unit achieves magnification variation by moving the image sensor, thus, for example, reducing the need for projecting the object side lens unit toward a subject to be photographed (the object side). As a result, the need for receiving light with a relatively wide angle of view is eliminated, and thus, for example, the diameter of the lens element included in the object side lens unit (for example, the front lens diameter) relatively decreases.

Moreover, in the optical unit, the image side lens unit also moves together with the image sensor. That is, the optical unit can correct aberration with the two movable bodies (the image side lens unit and image sensor). Therefore, compared to aberration correction with the image sensor only, the degree of freedom in designing improves, and further satisfactory aberration correction can be performed.

In particular, the optical unit moves the image side lens unit. Thus, aberration attributable to the lens units other than the image side lens unit (the object side lens unit and other lens units [intermediate lens units, i.e., lens units located between the image side lens unit and the object side lens unit]) can be efficiently corrected with the movable image side lens unit (thus increasing the degree of freedom in the aberration correction). Accordingly, in the optical unit, the degree of freedom in designing the lens units other than the image side lens unit improves.

Therefore, the optical unit can achieve relatively downsized lens diameters (front lens diameter and the like) and also satisfactory aberration correction.

According to another aspect of the invention, an optical unit has a focusing structure in which, while, of the plurality of lens units, at least one of the lens units other than the image side lens unit is not moved, the image side lens unit and the image sensor are moved integrally along the optical axis to thereby perform focusing.

That is, in the optical unit, in focusing, while the image sensor moves, at least one lens unit of the lens units other than the image side lens unit (for example, the object side lens unit) does not move as described above.

The focusing in which, while the image sensor moves, the lens unit does not move as described above provides the same effect as provided by the focusing in which, while the image sensor does not move, the lens unit moves, thus reducing the need for moving the lens unit close to the object side (for example, the object side lens unit), as is the case above. Thus, the optical unit can perform the same level of aberration correction as performed by focusing by not moving the image sensor.

Moreover, this optical unit can, for example, integrate the movable image sensor and the image side lens unit to thereby achieve downsizing, and also can efficiently correct aberration attributable to the lens units (the object side lens unit, intermediate lens units) other than the image side lens unit by the movable image side lens unit. Accordingly, in the optical unit, the degree of freedom in designing the lens units other than the image side lens unit improves.

The effects described above can also be provided by an image capturing apparatus, including an optical unit having: a variable magnification optical system including a plurality of lens units having at least the object side lens unit closest to an object side and the image side lens unit closest to the image side, and the image sensor for receiving light that has passed through the variable magnification optical system.

This is because the image capturing apparatus includes: the magnification variation structure in which, while, of the plurality of lens units, at least one of the lens units other than the image side lens unit is not moved, the image side lens unit and the image sensor are moved along the optical axis to thereby perform magnification variation; and a controller which drives the magnification variation structure to thereby move the image side lens unit and the image sensor along the optical axis.

An image capturing device includes: a focusing structure in which, of the plurality of lens units, at least one of the lens units other than the image side lens unit is not moved while the image side lens unit and the image sensor are integrally moved along the optical axis to thereby perform focusing; and a controller which drives the focusing structure to thereby move the image side lens unit and the image sensor along the optical axis.

The aforementioned object, other objects, and features of the present invention will be more clarified with reference to the description on the preferred examples below and the accompanying drawings.

BRIEF DESCRIPTION OF THE DRAWINGS

FIG. 7A is a spherical aberration diagram of the variable magnification optical system (Example 1) by which focusing with the shortest photographing distance is performed at the wide-angle end (W);

FIG. 7B is an astigmatism diagram of the variable magnification optical system (Example 1) by which focusing with the shortest photographing distance is performed at the wide-angle end (W);

FIG. 7C is a distortion diagram of the variable magnification optical system (Example 1) by which focusing with the shortest photographing distance is performed at the wide-angle end (W);

FIG. 8A is a spherical aberration diagram of the variable magnification optical system (Example 1) by which focusing with the shortest photographing distance is performed at the middle focal length (M);

FIG. 8B is an astigmatism diagram of the variable magnification optical system (Example 1) by which focusing with the shortest photographing distance is performed at the middle focal length (M);

FIG. 8C is a distortion diagram of the variable magnification optical system (Example 1) by which focusing with the shortest photographing distance is performed at the middle focal length (M);

FIG. 9A is a spherical aberration diagram of the variable magnification optical system (Example 1) by which focusing with the shortest photographing distance is performed at the telephoto end (T);

FIG. 9B is an astigmatism diagram of the variable magnification optical system (Example 1) by which focusing with the shortest photographing distance is performed at the telephoto end (T);

FIG. 9C is a distortion diagram of the variable magnification optical system (Example 1) by which focusing with the shortest photographing distance is performed at the telephoto end (T);

FIG. 14A is a spherical aberration diagram of the variable magnification optical system (Example 2) by which focusing with the shortest photographing distance is performed at the wide-angle end (W);

FIG. 14B is an astigmatism diagram of the variable magnification optical system (Example 2) by which focusing with the shortest photographing distance is performed at the wide-angle end (W);

FIG. 14C is a distortion diagram of the variable magnification optical system (Example 2) by which focusing with the shortest photographing distance is performed at the wide-angle end (W);

FIG. 15A is a spherical aberration diagram of the variable magnification optical system (Example 2) by which focusing with the shortest photographing distance is performed at the middle focal length (M);

FIG. 15B is an astigmatism diagram of the variable magnification optical system (Example 2) by which focusing with the shortest photographing distance is performed at the middle focal length (M);

FIG. 15C is a distortion diagram of the variable magnification optical system (Example 2) by which focusing with the shortest photographing distance is performed at the middle focal length (M);

FIG. 16A is a spherical aberration diagram of the variable magnification optical system (Example 2) by which focusing with the shortest photographing distance is performed at the telephoto end (T);

FIG. 16B is an astigmatism diagram of the variable magnification optical system (Example 2) by which focusing with the shortest photographing distance is performed at the telephoto end (T);

FIG. 16C is a distortion diagram of the variable magnification optical system (Example 2) by which focusing with the shortest photographing distance is performed at the telephoto end (T);

FIG. 21A is a spherical aberration diagram of the variable magnification optical system (Example 3) by which focusing with the shortest photographing distance is performed at the wide-angle end (W);

FIG. 21B is an astigmatism diagram of the variable magnification optical system (Example 3) by which focusing with the shortest photographing distance is performed at the wide-angle end (W);

FIG. 21C is a distortion diagram of the variable magnification optical system (Example 3) by which focusing with the shortest photographing distance is performed at the wide-angle end (W);

FIG. 22A is a spherical aberration diagram of the variable magnification optical system (Example 3) with which focusing with the shortest photographing distance is performed at the middle focal length (M);

FIG. 22B is an astigmatism diagram of the variable magnification optical system (Example 3) with which focusing with the shortest photographing distance is performed at the middle focal length (M);

FIG. 22C is a distortion diagram of the variable magnification optical system (Example 3) with which focusing with the shortest photographing distance is performed at the middle focal length (M);

FIG. 23A is a spherical aberration diagram of the variable magnification optical system (Example 3) by which focusing with the shortest photographing distance is performed at the telephoto end (T);

FIG. 23B is an astigmatism diagram of the variable magnification optical system (Example 3) by which focusing with the shortest photographing distance is performed at the telephoto end (T);

FIG. 23C is a distortion diagram of the variable magnification optical system (Example 3) by which focusing with the shortest photographing distance is performed at the telephoto end (T);

DESCRIPTION OF THE PREFERRED EMBODIMENTS

First Embodiment

Hereinafter, a variable magnification optical system and an image capturing apparatus according to the first embodiment will be described with reference to the accompanying drawings.

[1. Digital Camera]

Figure 2:
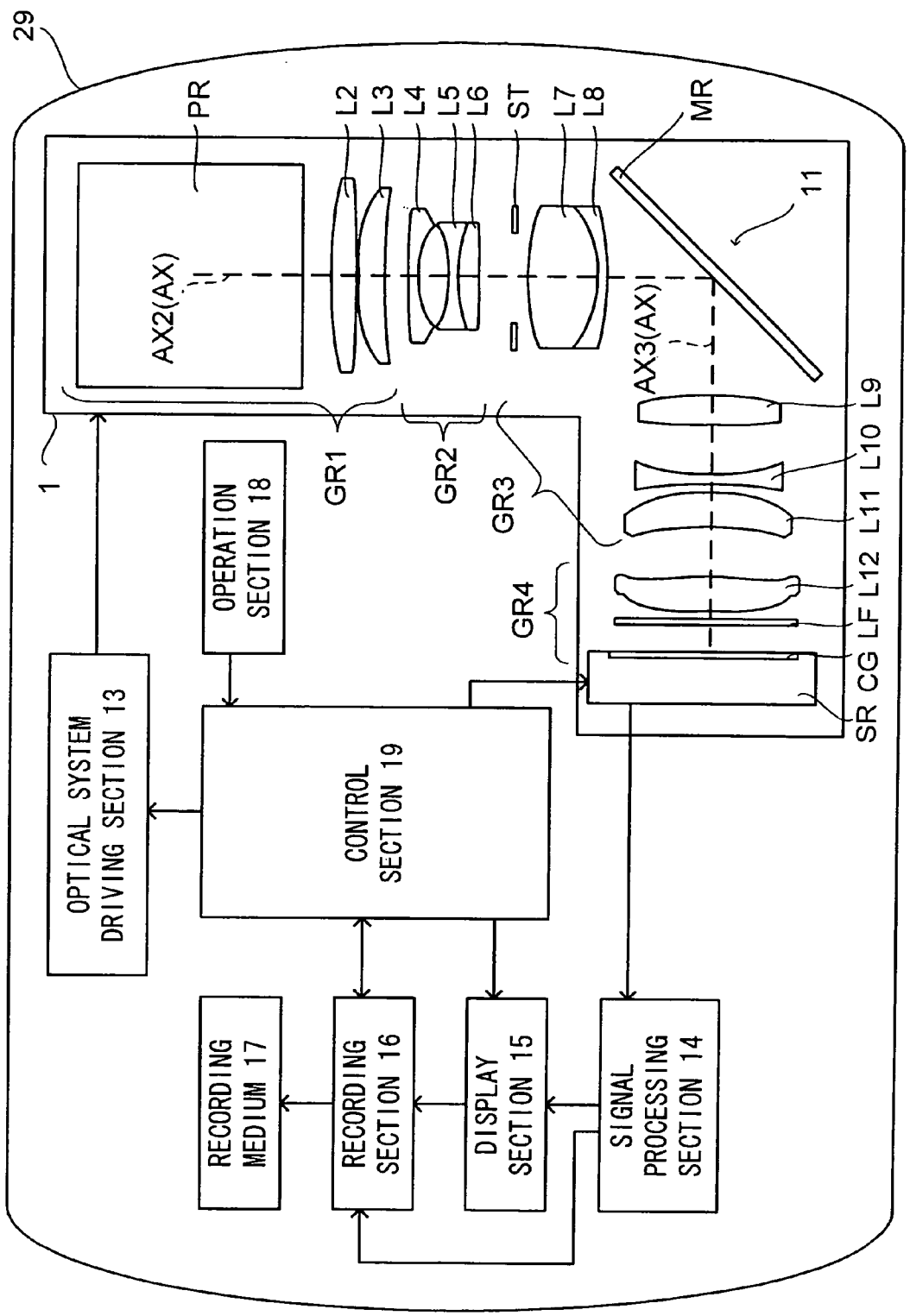
FIG. 2 is a schematic block diagram of a digital camera of each embodiment as viewed from the back.
Figure 3:
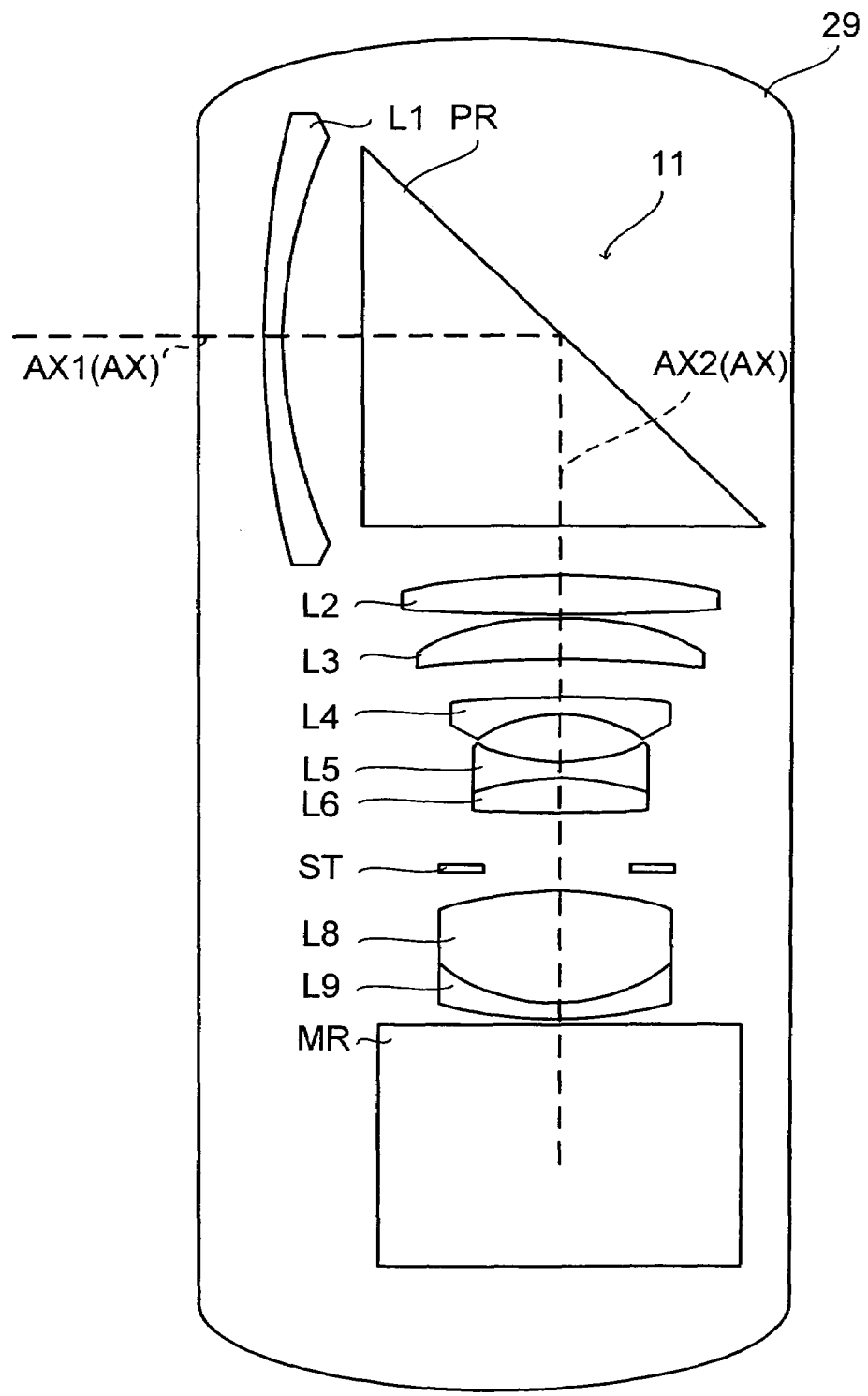
FIG. 3 is a schematic block diagram of the digital camera of each embodiment as viewed from the side.

FIGS. 2 and 3 are schematic block diagrams of a digital camera 29 as one example of the image capturing apparatus. FIG. 2 shows the construction of various parts, and an optical unit 1 built in the digital camera 29. On the other hand, FIG. 3 shows the side of the digital camera 29, specifically showing a variable magnification optical system 11 included in the optical unit 1.

As shown in FIG. 2, the digital camera 29 includes: the variable magnification optical system 11, an optical system driving part 13, an image sensor SR, a signal processing part 14, a display part 15, a recording part 16, a recording medium 17, an operation part 18, and a control part (controller) 19. The structure including the variable magnification optical system 11 and the image sensor SR is expressed as the optical unit 1.

The variable magnification optical system 11 is an optical system which guides light from a subject to be photographed to the image sensor SR and also which focuses it on the light-receiving surface (image sensing surface) of the image sensor SR. Therefore, this variable magnification optical system 11 may be expressed as a focusing optical system or image-sensing optical system (photographing optical system). The details of the variable magnification optical system 11 will be described later.

The optical system driving part 13 has several driving motors (optical system driving motors) and a transmitting mechanism (an optical system transfer mechanism) that transmits force of the driving motors to the lens units included in the variable magnification optical system 11 (both the driving motors and the moving mechanism are not shown). The optical system driving part 13 sets the focal length and the focal position of the variable magnification optical system 11 by use of the driving motors and the transmitting mechanism. More specifically, the optical system driving part 13 sets the focal length and the focal position in accordance with directions provided from the control part 19.

The image sensor SR corresponds to, for example, an area sensor of a CCD (Charge Coupled Device), a CMOS (Complementary Metal Oxide Semiconductor) sensor, or the like, and receives a ray of light that has traveled through the variable magnification optical system 11 and then converts it into an electrical signal (sensed data). Then, the image sensor SR outputs this sensed data to the signal processing part 14.

The signal processing part 14 processes electric data (sensed data) outputted from the image sensor SR to thereby generate sensed image data based on the sensed data. This signal processing part 14 turns on or off processing operation in accordance with directions provided from the control part 19. In addition, in accordance with directions provided from the control part 19, the signal processing part 14 outputs sensed image data to the display part 15 and the recording part 16.

The display part 15 is built with, for example, a liquid crystal panel, and displays sensed image data and the like outputted from the signal processing part 14, the usage condition of the digital camera 29, and the like.

The recording part 16 records sensed image data generated by the signal processing part 14 onto the recording medium 17 in accordance with directions provided from the control part 19. The recording part 16 also reads sensed image data from the recording medium 17 in accordance with directions provided from the control part 19 in response to operation made by the operation part 18 or the like.

The recording medium 17 may be, for example, incorporated inside the digital camera 29, or may be detachable like a memory card containing a flash memory or the like. Thus, the recording medium 17 may be any medium (optical disc, semiconductor memory, or the like) that is capable of recording sensed image data and the like.

The operation part 18 outputs to the control part 19 various operation directions given by the user or the like, and includes, for example, a shutter release button, an operation dial, and the like.

The control part 19 is a center portion that performs entire operation control and the like, and organically controls driving of each member of the digital camera 29 to thereby achieve integrated control.

[2. Optical Unit]

Now, the optical unit 1 including the variable magnification optical system 11 and the image sensor SR will be described with reference to FIGS. 1 to 3. As shown in FIGS. 2 and 3, the optical unit 1 is stored inside the digital camera 29. The optical unit 1 bends a ray of light with a prism PR and a mirror MR. The optical axis in this optical unit 1 is represented as AX (AX1 to AX3).

Figure 1:
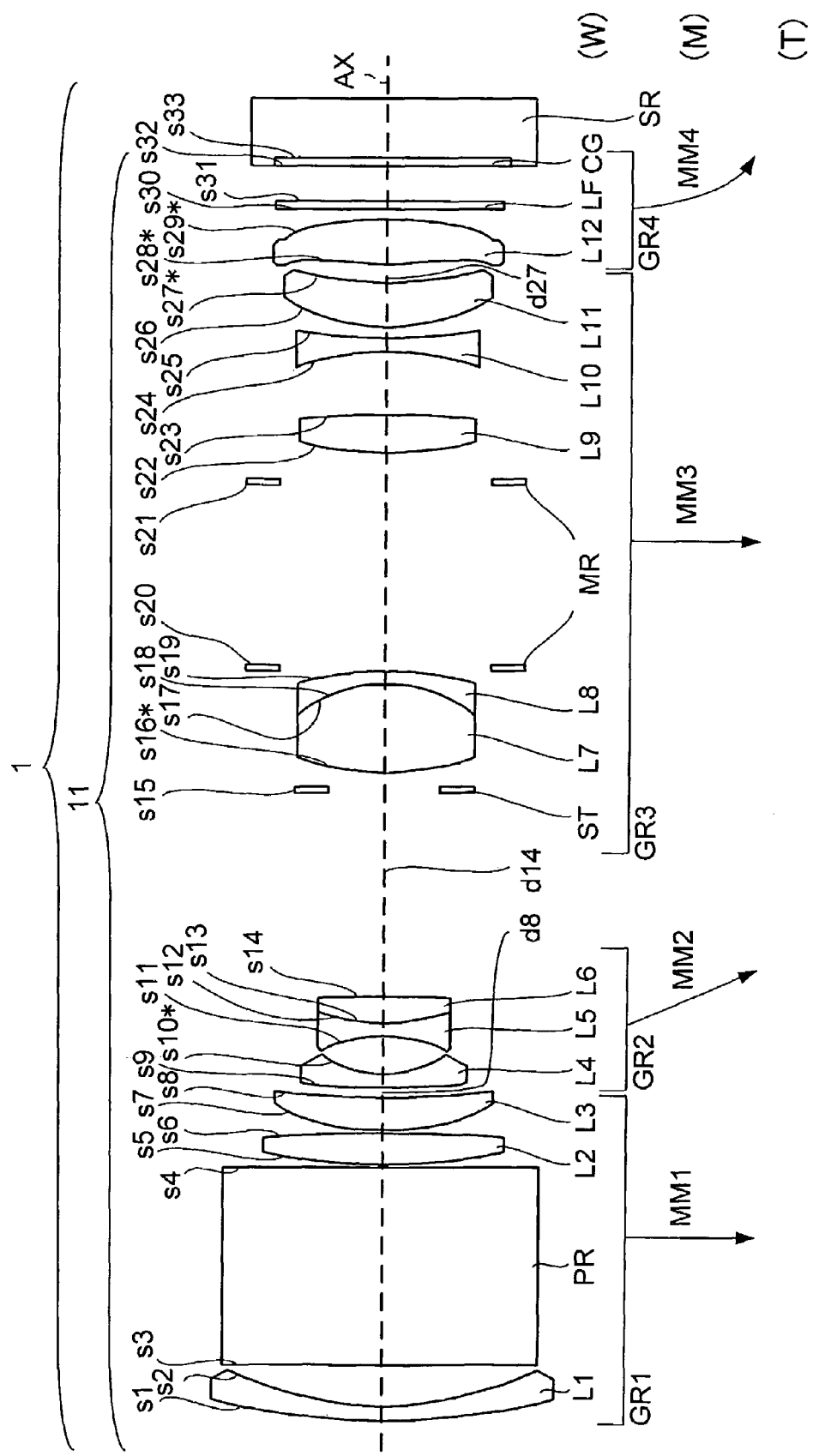
FIG. 1 is a lens construction diagram of a variable magnification optical system in an optical unit (Example 1)

FIG. 1 is a lens construction diagram of the optical unit 1 shown in FIGS. 2 and 3, which is expanded in a row for convenience. The optical unit 1 as shown in FIG. 1 includes the variable magnification optical system 11 and the image sensor SR.

In FIG. 1, GRi denotes a lens unit, Li denotes a lens element, and si denotes a surface (transmission surface or the like). Numbers (i) placed in GRi, Li, and si each denote the place in order from the object side to the image side. Aspherical surfaces are suffixed with * (asterisk). The variable magnification optical system 11 shown in FIG. 1 is defined as Example 1.

[2-1. Structure of the Optical Unit]

The variable magnification optical system 11 of the optical unit 1 includes in order from a subject to be photographed (the object side): a first lens unit GR1, a second lens unit GR2, a third lens unit GR3, and a fourth lens unit GR4.

[2-1-1. First Lens Unit]

The first lens unit (the object side lens unit, the lens unit at the first place) GR1 includes: a first lens element L1, an optical prism PR, a second lens element L2, and a third lens element L3. This first lens unit GR1 has, as a whole, a positive optical power (refractive power). The optical power is defined by the reciprocal of the focal length.

The first lens element (front lens) L1 is a negative meniscus lens element convex on the object side.

The optical prism PR is a prism capable of bending a ray of light from the object side at a right angle (for example, right angle prism). In the optical prism PR, s3 is a surface on which a ray of light is made incident, and s4 is a surface from which a ray of light exits.

The second lens element L2 is a positive lens element convex on both sides (biconvex lens element). The third lens element L3 is a positive meniscus lens element convex on the object side.

[2-1-2. Second Lens Unit]

The second lens unit (intermediate lens unit, the lens unit at the second place) GR2 includes a fourth lens element L4, a fifth lens element L5, and a sixth lens element L6. This second lens unit GR2 has, as a whole, a negative optical power.

The fourth lens element L4 is a negative meniscus lens element convex on the object side. Numeral s10 is an aspherical surface (an aspherically shaped refracting optical surface, a surface capable of refraction equivalent to that provided by an aspherical surface, or the like).

The fifth lens element L5 is a negative lens element (biconcave lens element) concave on both sides. The sixth lens element L6 is a positive lens element convex on both sides. The fifth lens element L5 and the sixth lens element L6 compose a cemented lens element formed by cementing together s12 and s13. Methods of cementing include, for example, cementing with a bonding agent (methods of cementing for cemented lens elements to be described later also include cementing with a bonding agent or the like).

[2-1-3. Third Lens Unit]

The third lens unit (intermediate lens unit, the lens unit at the third place) GR3 includes: an optical aperture stop ST, a seventh lens element L7, an eighth lens element L8, a reflective mirror MR, a ninth lens element L9, a tenth lens element L10, and an eleventh lens element L11. This third lens unit GR3 has, as a whole, a positive optical power.

The optical aperture stop ST is an aperture stop with a variable aperture diameter. This optical aperture stop ST is integrally formed with the third lens unit GR3. In FIG. 1, this optical aperture stop ST itself is represented by s15 for convenience. At a section where this optical aperture stop ST is disposed, a shutter may be formed, because such a structure requires no drive source and no moving mechanism for moving the optical aperture stop ST and the shutter, thus resulting in downsizing of the optical unit 1.

The seventh lens element L7 is a positive lens element convex on both sides. Numeral s16 is an aspherical surface. The eighth lens element L8 is a negative meniscus lens element concave on the object side. The seventh lens element L7 and the eighth lens element L8 compose a cemented lens element formed by cementing together s17 and s18.

The reflective mirror MR reflects a ray of light exiting from the eighth lens element L8 to thereby guide it to the ninth lens element L9. This reflective mirror MR is located between the eighth lens element L8 and the ninth lens element L9.

The ninth lens element L9 is a positive lens element convex on both sides. The tenth lens element L10 is a negative lens element concave on both sides.

The eleventh lens element L11 is a positive meniscus lens element convex on the object side. Numeral s27 is an aspherical surface.

[2-1-4. Fourth Lens Unit]

The fourth lens unit (the image side lens unit, the lens unit at the fourth place) GR4 includes a twelfth lens element L12, a low pass filter LF, and a cover glass CG. This fourth lens unit GR4 has, as a whole, a positive optical power.

The twelfth lens element L12 is a positive lens element convex on both sides. Numerals s28 and s29 are aspherical surfaces.

The low pass filter LF is a filter composed of two surfaces (s30, s31), and is an optical filter (for example, infrared cut filter) having a predetermined cutoff frequency characteristic determined by the pixel pitch of the image sensor SR.

The cover glass CG is a glass composed of two surfaces (s32, s33) that protect the light-receiving surface of the image sensor SR. Therefore, the surface s33 of the cover glass CG and the light-receiving surface of the image sensor SR are so disposed as to come extremely close to each other (for example, with a gap of approximately 0.5 mm between the surface s33 and the light-receiving surface).

[2-1-5. Image Sensor]

The image sensor SR in the optical unit 1 is movable. For example, the image sensor SR is moved by an image sensor driving part, not shown, that includes a driving motor (an image sensor driving motor) and a transmitting mechanism (a image sensor transmitting mechanism) for transmitting a driving force of the driving motor to the image sensor SR.

The source of moving the image sensor SR is not limited to only the driving force of this image sensor driving part. For example, the image sensor SR and the fourth lens unit GR4 may be linked (coupled) together so as to be moved simultaneously (integrally) by a driving force of the optical system driving part 13.

Such a structure requires, for example, no drive source dedicated for moving the image sensor SR and no drive source dedicated for moving the fourth lens unit GR4. In addition, integrating the image sensor SR and the fourth lens unit GR4 closely together results in a relatively smaller gap between the two (the image sensor SR and the fourth lens unit GR4), thus resulting in the downsizing of the optical unit 1.

Therefore, Example 1 and Example 2 to be described later exemplify the optical unit 1 in which the image sensor SR and the fourth lens unit GR4 integrally move. The linkage, i.e., integration, between the image sensor SR and the fourth lens unit GR4 can be achieved through bonding between the housing of the image sensor SR and the fourth lens unit GR4 or otherwise.

[2-2. Construction Data for the Variable Magnification Optical System (Example 1)]

Next, construction data for the variable magnification optical system 11 of Example 1 included in the optical unit 1 described above will be described with reference to Tables 1 and 2.

Numeral ri in Table 1 denotes a radius of curvature (in mm) of each surface (si). Aspherical surfaces are suffixed with asterisks (*). Numeral di denotes an axial surface distance (in mm) between the i-th surface (si) and the (i+1) the surface (si+1). In a case where the axial surface distance changes (varies) by zooming, di at the wide-angle end position (W), di at the intermediate focal length position (M), and di at the telephoto end position (T) are indicated in this order.

Numerals Ni and υi denote the refractive index (Nd) and Abbe number (vd) possessed by a medium at the axial surface distance (di). The refractive index (Nd) and the Abbe number (vd) are provided for a d-line (wavelength 587.56 nm).

The "focal length position" implies the wide-angle end position (W; shortest focal length position) to the intermediate focal length position (M) to the telephoto end position (T; longest focal length position). Numerals f and FNO denote the focal length F (in mm) and f-number, respectively, of the entire system corresponding to the respective focal length positions (W), (M), and (T).

The aspherical surface described above is defined by formula below (definitional equation 1):

$$X(H) = C_0 \cdot H^2 / (1 + \sqrt{1 - \epsilon \cdot C_0^2 \cdot H^2}) + \Sigma A_j \cdot H^j \quad \text{(Definitional equation 1)}$$

where,
- H represents the height in the direction perpendicular to the optical axis AX;
- X (H) represents the displacement in the direction of the optical axis AX at the height H;
- C0 represents the paraxial curvature (=1/ri);
- $\epsilon$, represents the quadric surface parameter;
- j represents the order of the aspherical surface; and
- Aj represents the aspherical surface coefficient of order j.

Table 2 shows data on the aspherical surfaces (aspherical surface data). Here, it should be noted that the coefficient of any term that does not appear in the tables equals zero, and that, for all the data, E-n stands for $\times 10^{-n}$.

[2-3. Movement of Each Lens Unit in the Optical Unit]

[2-3-1. Zooming]

Now, the movement of each of the lens units (GR1 to GR4) will be described with reference to FIG. 1. Magnification variation (zooming) in the optical unit 1 is performed by varying gaps between the lens units along the optical axis AX. For example, the optical unit 1 of FIG. 1 moves part of the lens units (the second lens unit GR2 and the like) in zooming.

For convenience, in FIG. 1, only the axial surface distances (di) that vary during the zooming are numbered. More specifically, d8, d14, and d27 are shown in the figure.

The lens construction diagram of this FIG. 1 shows the lens arrangement at the wide-angle end position (W) in an optical cross section. Arrows MMi in the figure schematically show the movements of the lens units from the wide-angle end position (W) to the intermediate focal length position (M) and further from the intermediate focal length position (M) to the telephoto end position (T). The letter i in MMi denotes the place in order from the object side to the image side; therefore, this letter corresponds to the place of a respective lens unit.

Thus, when zooming from the wide-angle end position (W) to the telephoto end position (T) is performed, in the optical unit 1 of FIG. 1, the gap between the first lens unit GR1 and the second lens unit GR2 becomes larger, the gap between the second lens unit GR2 and the third lens unit GR3 becomes smaller, and the gap between the third lens unit GR3 and the fourth lens unit GR4 (fourth lens unit GR4 integrated with the image sensor; hereinafter, may also be expressed as GR4+SR) becomes larger.

More specifically, the optical unit 1 moves the second lens unit GR2 to the image side and the fourth lens unit GR4 (GR4+SR) to the image side while not moving the first lens unit GR1 and the third lens unit GR3 (while fixing them in position) to thereby achieve zooming.

Table 3 shows the amounts of movements of the lens units (GR1 to GR4 (GR4+SR)) in zooming.

In this Table 3, the wide-angle end position (W) serves as a reference. Thus, the amount of movement at the wide-angle end position (W) is 0.0000 (in mm). With respect to this reference (at the wide-angle end position (W)), the movement direction from the object side to the image side is represented as +, and the movement direction from the image side to the object side is represented as −. Numeral TL (in mm) in this table represents the distance from the vertex of the surface s1 in the first lens element L1 surface to the light-receiving surface of the image sensor SR.

As can be seen from this Table 3 and FIG. 1, in the optical unit 1 including the variable magnification optical system 11 of Example 1, movable lens units are the second lens unit GR2 and the fourth lens unit GR4 (GR4+SR). Then, the second lens unit GR2 functions as a variator for varying the focal length, and the fourth lens unit GR4 (GR4+SR) functions as a compensator for correcting image point movement made by zooming.

Figure 4A:
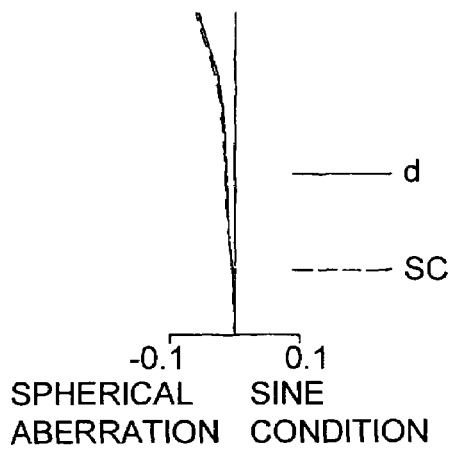
FIG. 4A is a spherical aberration diagram of the variable magnification optical system (Example 1) at the wide-angle end (W)
Figure 4B:
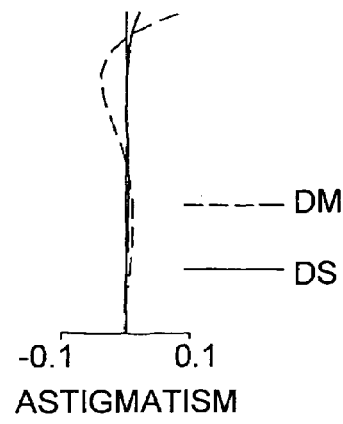
FIG. 4B is an astigmatism diagram of the variable magnification optical system (Example 1) at the wide-angle end (W)
Figure 4C:
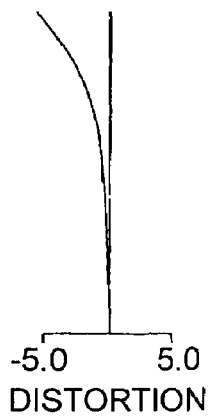
FIG. 4C is a distortion diagram of the variable magnification optical system (Example 1) at the wide-angle end (W)
Figure 5A:
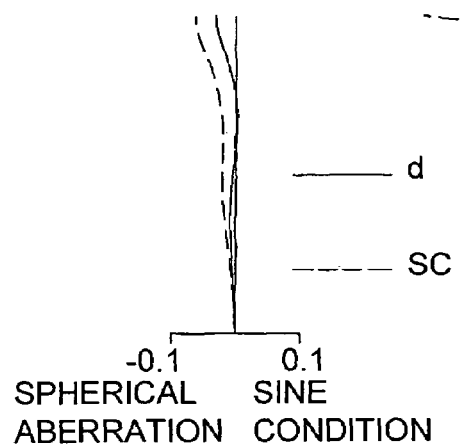
FIG. 5A is a spherical aberration diagram of the variable magnification optical system (Example 1) at the middle focal length (M)
Figure 5B:
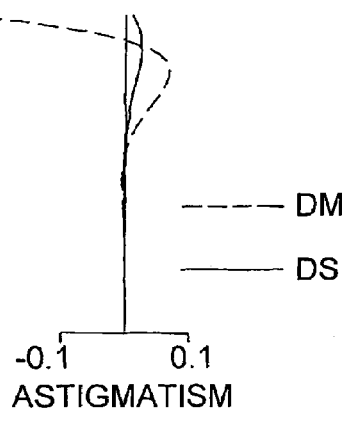
FIG. 5B is an astigmatism diagram of the variable magnification optical system (Example 1) at the middle focal length (M)
Figure 5C:
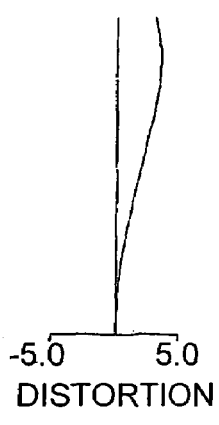
FIG. 5C is a distortion diagram of the variable magnification optical system (Example 1) at the middle focal length (M)
Figure 6A:
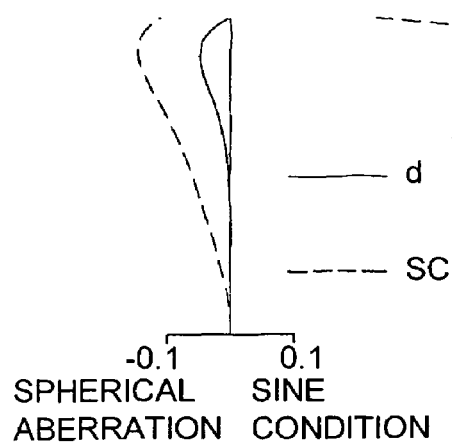
FIG. 6A is a spherical aberration diagram of the variable magnification optical system (Example 1) at the telephoto end (T)
Figure 6B:
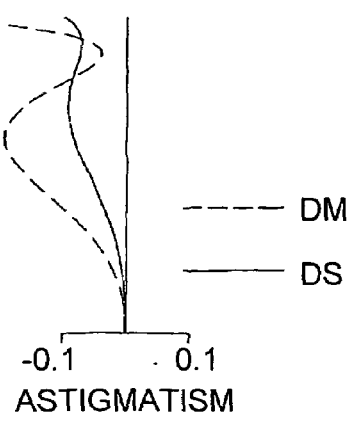
FIG. 6B is an astigmatism diagram of the variable magnification optical system (Example 1) at the telephoto end (T)
Figure 6C:
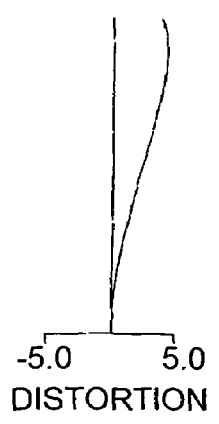
FIG. 6C is a distortion diagram of the variable magnification optical system (Example 1) at the telephoto end (T)

FIGS. 4A to 6C show aberrations occurring with the variable magnification optical system 11 in zooming. More specifically, FIGS. 4A to 4C show the aberrations at the wide-angle end position (W), FIGS. 5A to 5C show the aberrations at the intermediate focal length position (M), and FIGS. 6A to 6C show the aberrations at the telephoto end position (T).

FIGS. 4A, 5A, and 6A show the spherical aberrations and sine conditions. In the figures, a line d represents the spherical aberration (in mm) for the d-line, and a broken line SC represents a deviation (in mm) from the sine condition. In these figures, FNOs (f-numbers) are also represented.

FIGS. 4B, 5B, and 6B show the astigmatisms. A broken line DM indicates the astigmatism (in mm) for the d-line on the meridional surface. A line DS indicates the astigmatism (in mm) for the d-line on the sagittal surface. In each of these figures, the maximum image height on the light-receiving surface of the image sensor SR (the distance from the optical axis AX), Y' (in mm), is also represented.

FIGS. 4C, 5C, and 6C show the distortion. In the figures, a solid line indicates the distortion (in %) for the d-line. In each of these figures, Y' is also represented.

[2-3-2. Focusing]

Next, focusing in the optical unit 1 will be described with reference to Table 4. This Table 4 shows the amounts of movements of the lens units when a subject to be photographed (subject) is photographed in the optical unit 1 after zooming as described above, that is, the amounts of movements when the lens units are moved from the position focused at infinity to the position focused at the closest distance.

In this Table 4, the positional relationship between the lens units at the focal length positions (W), (M), and (T) in Table 3 serves as a reference. The shortest photographing distance (in mm) in Table 4 is a distance from the surface of the subject (subject surface) to the vertex of the s1 surface in the first lens element L1.

As shown in this Table 4, in focusing at any of the focal length positions, in the optical unit 1 of FIG. 1, the fourth lens unit GR4 (GR4+SR) moves to the image side while the first lens unit GR1 to the third lens unit GR3 do not move.

FIGS. 7A to 9C show aberrations occurring with the variable magnification optical system 11 in focusing. More specifically, FIGS. 7A to 7C show the aberrations at the wide-angle end position (W) and a shortest photographing distance of 0.2 (m), FIGS. 8A to 8C show the aberrations at the intermediate focal length position (M) and a shortest photographing distance of 0.9 (m), and FIGS. 9A to 9C show the aberrations at the telephoto end position (T) and a shortest photographing distance of 0.9 (m).

FIGS. 7A, 8A, and 9A are spherical aberration diagrams, FIGS. 7B, 8B, and 9B are astigmatism diagrams, and FIGS. 7C, 8C, and 9C are distortion diagrams. Thus, description of the lines is to be referred to that given in FIGS. 4 to 6 above.

[3. One Example of Various Features]

As described above, the optical unit 1 (the optical unit 1 including the variable magnification optical system 11 of Example 1) includes the variable magnification optical system 11 including the first to fourth lens units GR1 to GR4 (a plurality of lens units), and also includes the image sensor SR that receives light from a subject to be photographed via this variable magnification optical system 11.

In this optical unit 1, the first lens unit GR1 and the third lens unit GR3 do not move in zooming. More specifically, of the plurality of lens unit (GR1 to GR4), at least one of the lens units other than the fourth lens unit GR4 closest to the image side (the first lens unit GR1 and the third lens unit GR3 in Example 1) are not moved. On the other hand, the fourth lens unit GR4 closest to the image side and the image sensor SR move along the optical axis AX.

Typically, when, while this image sensor SR is immovable (fixed), a lens unit closer to the subject to be photographed (the object side) than the image sensor SR (for example, the first lens unit GR1) is movable, a larger gap between the image sensor SR and the first lens unit GR1 (that is, a longer full length of the optical unit 1) tends to result in a larger diameter of a lens element included in the first lens unit GR1 (for example, the diameter of the first lens element L1 or the front lens diameter).

This tendency is attributable to that the first lens element L1 comes close to the subject to be photographed, which requires reception of light with a relatively wide angle of view. Therefore, this tendency is remarkable in wide-angle photographing (at the wide-angle end position).

However, in the optical unit, the image sensor SR moves (is movable) in zooming. On the other hand, at least one of the lens units other than the fourth lens unit GR4 (for example, the first lens unit GR1) is immovable even in zooming.

The zooming in which, while the image sensor SR moves, the first lens unit GR1 does not move as described above provides the same effect as provided by zooming in which, while the image sensor SR does not move, the first lens unit GR1 moves. This is because the fact that, while the image sensor SR does not move, the first lens unit GR1 moves is relatively synonymous with (equivalent to) the fact that, while the image sensor SR moves, the first lens unit GR1 does not move.

The optical unit 1 can achieve zooming (wide-angle end photographing in particular) by moving the image sensor SR, thus, for example, eliminating the need for projecting the first lens unit GR1 toward the subject to be photographed (the object side). As a result, for example, the diameter of the first lens element L1 or the like included in the first lens unit GR1 (for example, the front lens diameter) relatively decreases (is downsized).

When the optical unit 1 performs zooming, the various aberrations as described above occur. To correct these aberrations, the optical unit 1 can move only the image sensor SR. However, it is difficult to achieve satisfactory correction by moving the image sensor SR only.

Thus, in the optical unit 1, the fourth lens unit GR4 moves together with the image sensor SR. That is, the optical unit 1 can correct aberrations with two movable bodies (the fourth lens unit GR4 or the like, the image sensor SR). Therefore, this permits more satisfactory correction of aberrations, compared to correction achieved with the image sensor SR only.

In terms of aberration correction, the fourth lens unit GR4 includes a lens element having aspherical surfaces (s28, s29). With such a structure, the optical unit 1 can effectively correct aberration.

The optical unit 1 moves the fourth lens unit GR4. Thus, aberration attributable to the lens units other than the fourth lens unit GR4 (the first to third lens units GR1 to GR3) can be effectively corrected by the movable fourth lens unit GR4. Thus, in the optical unit 1, the degree of freedom in designing the first to third lens units GR1 to GR3 (for example, the degree of freedom in designing the curvature or the like) improves.

Therefore, the optical unit 1 can achieve relatively downsized lens diameters (front lens diameter and the like) and also satisfactory aberration correction.

Moreover, the optical unit 1 has the fourth lens unit GR4 and the image sensor SR integrated together, and, in the case focusing, does not move, of the plurality of lens units (GR1 to GR4), at least one of the lens units (GR1 to GR3) other than the fourth lens unit GR4 while simultaneously (integrally) moving the fourth lens unit GR4 and the image sensor SR along the optical axis AX.

Typically, when zooming and then focusing are performed in the variable magnification optical system 11, any of the plurality of lens units (GR1 to GR4) moves. Thus, various aberrations are likely to occur. When short-distance photographing (for example, photographing at the shortest photographing distance), in particular, is performed, the amount of movement of the lens unit required for focusing becomes relatively larger. Thus, remarkable aberration is likely to occur.

Thus, in the optical unit 1, in focusing, while the image sensor SR moves, at least one (for example, the first lens unit GR1) of the lens units (GR1 to GR3) other than the fourth lens unit GR4 does not move.

The focusing in which, while the image sensor SR moves, the first lens unit GR1 does not move as described above provides the same effect as provided by the focusing in which, while the image sensor SR does not move, the first lens unit GR1 moves. Thus, the optical unit 1 can perform the same level of aberration correction as the focusing performed by not moving the image sensor.

Moreover, the optical unit 1 has the moving image sensor SR and fourth lens unit GR4 integrated together, thus resulting in the downsizing of the optical unit 1 as described above. Moreover, aberration attributable to the lens units (GR1 to GR3) other than the fourth lens unit GR4 is effectively corrected by the movable fourth lens unit GR4, thus improving the degree of freedom in designing the first to third lens units GR1 and GR3 in the optical unit 1.

As described above, occurrence of aberration attributable to the movement of the lens unit is prevented. This simplifies the design of the fourth lens unit GR4 for aberration correction, thus improving the degree of freedom in designing this fourth lens unit GR4.

In the optical unit 1, the plurality of lens units (GR1 to GR4) include at least in order from the object side, the first lens unit GR1 having a positive optical power, the second lens unit GR2 having a negative optical power, the third lens unit GR3 having a positive optical power, and the fourth lens unit GR4 having a positive optical power.

In zooming from the wide angle end position (W) to the telephoto end position (T), at the telephoto end position (T) compared to the wide-angle position (W), such an optical unit 1 increases the gap between the first lens unit GR1 and the second lens unit GR2, decreases the gap between the second lens unit GR2 and the third lens unit GR3, and increases the gap between the third lens unit GR3 and the fourth lens unit GR4.

In such an optical unit 1, the first lens unit GR1 has a positive optical power, and the next second lens unit GR2 has a negative optical power. Accordingly, light from a subject to be photographed is first converged by the first lens unit GR1. Subsequently, this converged light is diverged by the second lens unit GR2.

In this case, the gap between the first lens unit GR1 and the second lens unit GR2 becomes larger. Accordingly, the composite focal length of the first lens unit GR1 and the second lens unit GR2 becomes shorter than the focal length of the variable magnification optical system 11 (the focal length of the entire system). Further, the second lens unit GR2 suppresses the light convergence before the light that has passed through first lens unit GR1 is focused, thus shifting the focusing point toward the image sensor side. Accordingly, in the previously specified full length of the optical unit 1, the focal length becomes relatively longer. Thus, the optical unit 1 has a relatively high magnification (relatively high magnification variation ratio).

The optical unit 1 increases the gap between the first lens unit GR1 and the second lens unit GR2, decreases the gap between the second lens unit GR2 and the third lens unit GR3, and increases the gap between the third lens unit GR3 and the fourth lens unit GR4. Zooming with such gaps may be performed by either movements of one lens unit (for example, the second lens unit GR2) and the fourth lens unit GR4, or by movements of the plurality of lens units (GR1 to GR3) other than the fourth lens unit GR4 and the fourth lens unit GR4.

Accordingly, various movements of the lens units (GR1 to GR4) for zooming can be assumed. Therefore, a relatively small number of lens units (for example, GR2, GR4) may be involved in zooming (involved in magnification variation), or a relatively large number of lens units (for example, GR1, GR2, GR4) may be involved in zooming. Therefore, the optical unit 1 can improve the degree of freedom in the movements of the lens units.

Second Embodiment

The second embodiment will be described. Members functioning in the same manner as those used in the first embodiment are provided with the same numerals and thus are omitted from the description.

In the optical unit 1 of the first embodiment, of the plurality of lens units (GR1 to GR4), more specifically, the lens units (GR1 to GR3) other than the fourth lens unit GR4, the first lens unit GR1 and the third lens unit GR3 do not move. However, the number of lens units in the optical unit 1 that do not move is not necessarily two.

That is, of the lens units (GR1 to GR3) other than the fourth lens unit GR4, at least one lens unit may not move. Thus, the optical unit 1 including the variable magnification optical system 11 in which only the first lens unit GR1 does not move will be described.

[1. Optical Unit]

Hereinafter, the optical unit 1 in which the second lens unit GR2, the third lens unit GR3, and the fourth lens unit GR4 (GR4+SR) are movable in zooming will be described with referent to FIG. 10. The variable magnification optical system 11 included in the optical unit 1 of this embodiment is provided as Example 2. In this Example 2, the variable magnification optical system 11 has components thereof arranged in a row.

[1-1. Structure of the Optical Unit]

The variable magnification optical system 11 of the optical unit 1 (Example 2), as is the case with Example 1, includes in order from a subject to be photographed (the object side): a first lens unit GR1, a second lens unit GR2, a third lens unit GR3, and a fourth lens unit GR4.

[1-1-1. First Lens Unit]

The first lens unit (the object side lens unit, the lens unit at the first place) GR1 includes: a first lens element L1, a second lens element L2, and a third lens element L3. This first lens unit GR1 has, as a whole, a positive optical power (refractive power).

The first lens element (front lens) L1 is a negative meniscus lens element convex on the object side.

The second lens element L2 is a positive meniscus lens element convex on the object side. The first lens element L1 and the second lens element L2 compose a cemented lens element formed by cementing together s2 and s3.

The third lens element L3 is a positive meniscus lens element convex on the object side.

[1-1-2. Second Lens Unit]

The second lens unit (intermediate lens unit, the lens unit at the second place) GR2 includes: a fourth lens element L4, a fifth lens element L5, a sixth lens element L6, a seventh lens element L7, and an eighth lens element L8. This second lens unit GR2 has, as a whole, a negative optical power.

The fourth lens element L4 is a negative meniscus lens element convex on the object side. The fifth lens element L5 is a positive meniscus lens element concave on the object side. The sixth lens element L6 is a negative lens element concave on both sides. The fifth lens element L5 and the sixth lens element L6 compose a cemented lens element formed by cementing together s10 and s11.

The seventh lens element L7 is a positive meniscus lens element convex on the object side. The eighth lens element L8 is a negative lens element concave on both sides.

[1-1-3. Third Lens Unit]

The third lens unit (intermediate lens unit, the lens unit at the third place) GR3 includes: an optical aperture stop ST, a ninth lens element L9, a tenth lens element L10, an eleventh lens element L11, and a twelfth lens element L12. This third lens unit GR3 has, as a whole, a positive optical power.

The optical aperture stop ST is an aperture stop with a variable aperture diameter, as is the case above. This optical aperture stop ST is integrally formed with the third lens unit GR3. In FIG. 10, this optical aperture stop ST itself is represented by s17 for convenience.

The ninth lens element L9 is a positive lens element convex on both sides. The tenth lens element L10 is a positive meniscus lens element convex on the object side. The eleventh lens element L11 is a negative meniscus lens element convex on the object side. The tenth lens element L10 and the eleventh lens element L11 compose a cemented lens element formed by cementing together s21 and s22.

The twelfth lens element L12 is a positive meniscus lens element convex on the object side. Numeral s25 is an aspherical surface.

[1-1-4. Fourth Lens Unit]

The fourth lens unit (the image side lens unit, the lens unit at the fourth place) GR4 includes: a thirteenth lens element L13, a fourteenth lens element L14, a parallel plane plate PT, and a cover glass CG. This fourth lens unit GR4 has, as a whole, a positive optical power.

The thirteenth lens element L13 is a negative meniscus lens element concave on the object side. The fourteenth lens element L14 is a positive meniscus lens element concave on the object side. Numerals s28 and s29 are aspherical surfaces.

The parallel flat plane plate PT is composed of two surfaces (s30, s31), and has a function as a low pass filter.

The cover glass CG is a glass composed of two surfaces (s32, s33) that protect the light-receiving surface of the image sensor SR. Therefore, the surface s33 of the cover glass CG and the light-receiving surface of the image sensor SR are so disposed as to come extremely close to each other.

[1-2. Construction Data for the Variable Magnification Optical System (Example 2)]

Tables 5 and 6 show construction data for the variable magnification optical system 11 of Example 2 described above. Note that these Tables 5 and 6 are expressed in the same manner as Tables 1 and 2 descried above.

[1-3. Movement of Each Lens Unit in the Optical Unit]

[1-3-1. Zooming]

Now, the movement of each of the lens units (GR1 to GR4) will be described with reference to FIG. 10. For convenience, in FIG. 10, only the axial surface distances (di) that vary during the zooming are numbered. More specifically, d6, d16, and d25 are shown in the figure.

Figure 10:
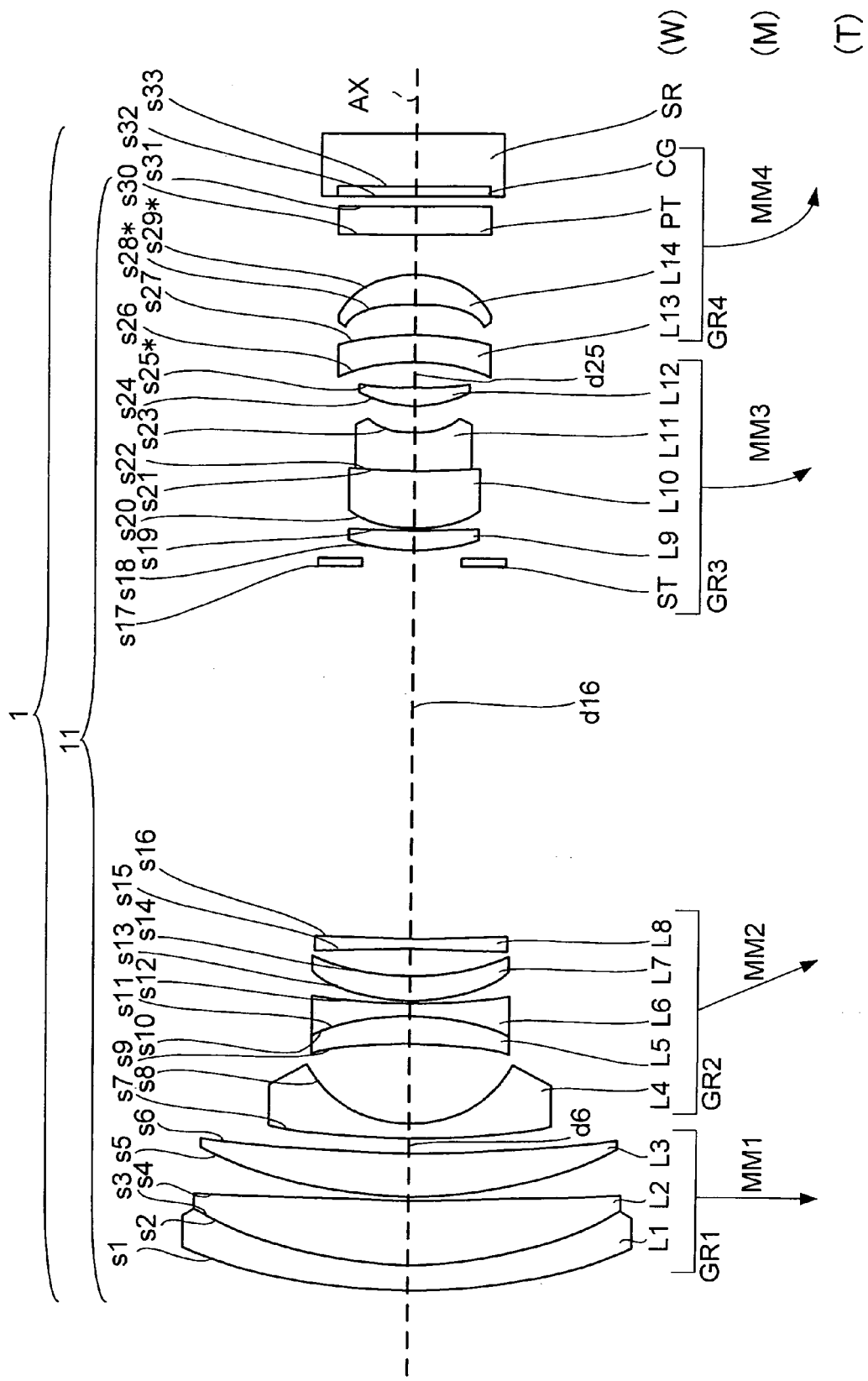
FIG. 10 is a lens construction diagram of a variable magnification optical system in an optical unit (Example 2)
Figure 11A:
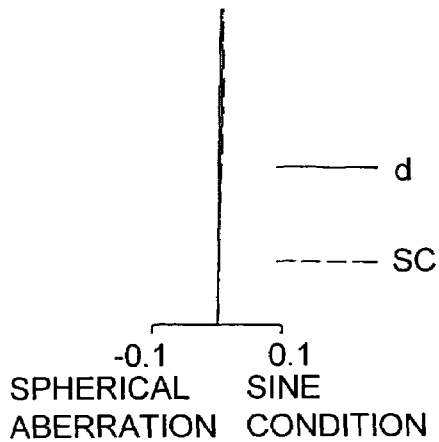
FIG. 11A is a spherical aberration diagram of the variable magnification optical system (Example 2) at the wide-angle end (W)
Figure 11B:
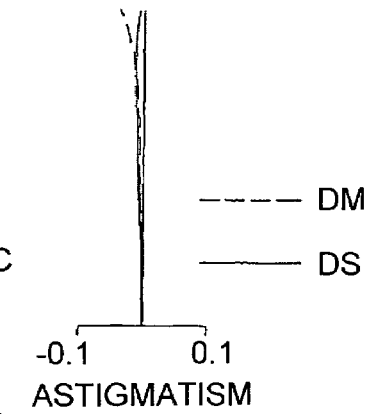
FIG. 11B is an astigmatism diagram of the variable magnification optical system (Example 2) at the wide-angle end (W)
Figure 11C:
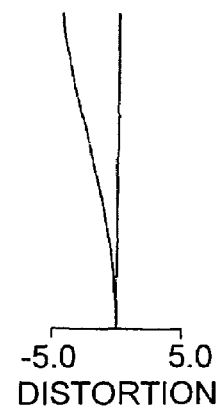
FIG. 11C is a distortion diagram of the variable magnification optical system (Example 2) at the wide-angle end (W)
Figure 12A:
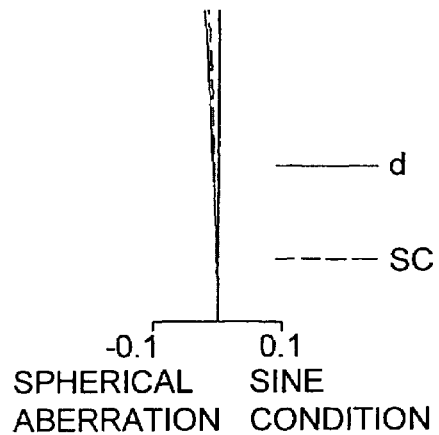
FIG. 12A is a spherical aberration diagram of the variable magnification optical system (Example 2) at the middle focal length (M)
Figure 12B:
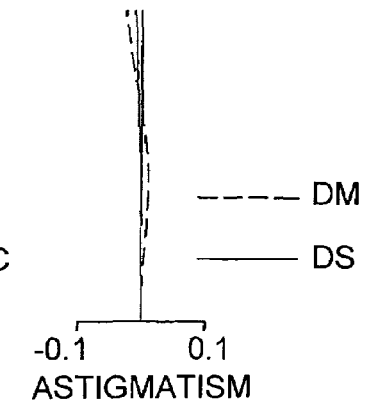
FIG. 12B is an astigmatism diagram of the variable magnification optical system (Example 2) at the middle focal length (M)
Figure 12C:
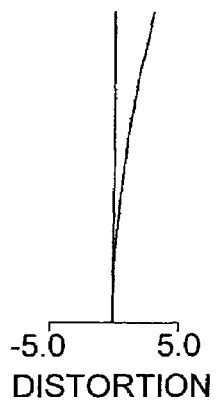
FIG. 12C is a distortion diagram of the variable magnification optical system (Example 2) at the middle focal length (M)
Figure 13A:
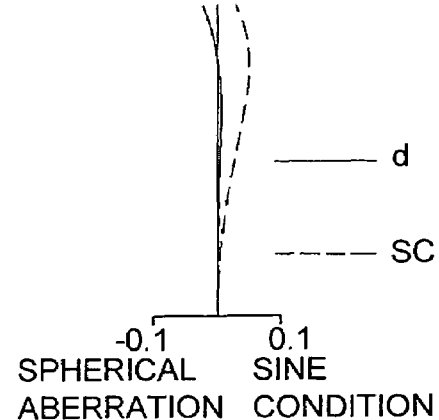
FIG. 13A is a spherical aberration diagram of the variable magnification optical system (Example 2) at the telephoto end (T)
Figure 13B:
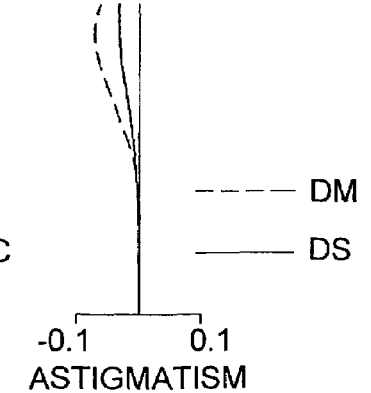
FIG. 13B is an astigmatism diagram of the variable magnification optical system (Example 2) at the telephoto end (T)
Figure 13C:
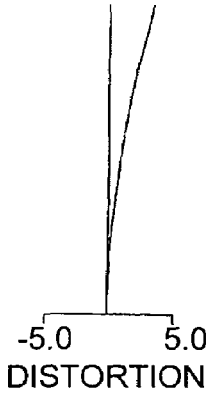
FIG. 13C is a distortion diagram of the variable magnification optical system (Example 2) at the telephoto end (T)

When zooming from the wide-angle end position (W) to the telephoto end position (T) is performed, in the optical unit 1 of FIG. 10, the gap between the first lens unit GR1 and the second lens unit GR2 becomes larger, the gap between the second lens unit GR2 and the third lens unit GR3 becomes smaller, and the gap between the third lens unit GR3 and the fourth lens unit GR4 (GR4+SR) becomes larger.

More specifically, the optical unit 1 moves the second lens unit GR2 to the image side and the third and fourth lens units GR3 and GR4 (GR4+SR) to the image side while not moving the first lens unit GR1 (while fixing it in position) to thereby achieve zooming.

Table 7 shows the amounts of movements of the lens units (GR1 to GR4 (GR4+SR)) during zooming. Note that this Table 7 is expressed in the same manner as Table 3 described above.

As can be seen from this Table 7 and FIG. 10, in the optical unit 1 including the variable magnification optical system 11 of Example 2, movable lens units are the second lens unit GR2, the third lens unit GR3, and the fourth lens unit GR4 (GR4+SR).

FIGS. 11A to 11C, 12A to 12C, and 13A to 13C show aberrations occurring with the variable magnification optical system 11 in zooming. These FIGS. 11A to 11C, 12A to 12C, and 13A to 13C are expressed in the same manner as FIGS. 4A to 4C, 5A to 5C, and 6A to 6C.

[1-3-2. Focusing]

Next, focusing in the optical unit 1 will be described with reference to Table 8. This Table 8 is expressed in the same manner as Table 4 described above.

As shown in this Table 8, in focusing at any of the focal length positions, in the optical unit 1 of FIG. 10, the fourth lens unit GR4 (GR4+SR) moves to the image side while the first lens unit GR1 to the third lens unit GR3 do not move.

FIGS. 14A to 14C, 15A to 15C, and 16A to 16C show aberrations occurring with the variable magnification optical system 11 in focusing. These FIGS. 14A to 14C, 15A to 15C, and 16A to 16C are expressed in the same manner as FIGS. 7A to 7C, 8A to 8C, and 9A to 9C described above.

[2. One Example of Various Features]

As described above, the optical unit 1 in the second embodiment includes, as is the case with the first embodiment, the variable magnification optical system 11 including the first to fourth lens units GR1 to GR4 (a plurality of lens units), and also includes the image sensor SR that receives light from a subject to be photographed via this variable magnification optical system 11.

In this optical unit 1, the first lens unit GR1 does not move in zooming. More specifically, of the plurality of lens unit (GR1 to GR4), the first lens unit GR1 as at least one of the lens units other than the fourth lens unit GR4 closest to the image side is not moved. On the other hand, the fourth lens unit GR4 closest to the image side and the image sensor SR move along the optical axis AX.

That is, the optical unit 1 of the second embodiment (see FIG. 10) is similar to that of the first embodiment except in that an immovable lens unit is only the first lens unit GR1, and thus serves as the optical unit 1 in which the fourth lens unit GR4 and the image sensor SR move (for example, optical powers are arranged in the same order). Thus, the optical unit 1 of the second embodiment provides the effect of the invention as described in the first embodiment.

Third Embodiment

The third embodiment will be described. Members functioning in the same manner as those used in the first and second embodiments are provided with the same numerals and thus are omitted from the description.

In the first and second embodiments, the optical unit 1 has been described which includes positive, negative, positive, and positive lens units (GR1 to GR4) arranged in this order from the object side. However, the optical unit 1 is not limited to such an arrangement.

[1. Optical Unit]

Now, the optical unit 1 with a different arrangement will be described with reference to FIG. 17. The variable magnification optical system 11 included in the optical unit 1 of this third embodiment is provided as Example 3. In this Example 3, the variable magnification optical system 11 has components thereof arranged in a row.

[1-1. Structure of the Optical Unit]

The variable magnification optical system 11 of the optical unit 1 (Example 3), as is the case with Examples 1 and 2, includes in order from a subject to be photographed (the object side): a first lens unit GR1, a second lens unit GR2, a third lens unit GR3, and a filter unit FU. This filter unit FU is located at the fourth position from the object side and thus may be represented as FU4.

[1-1-1. First Lens Unit]

The first lens unit (the object side lens unit, the lens unit at the first place) GR1 includes: a first lens element L1 and a second lens element L2. This first lens unit GR1 has, as a whole, a negative optical power.

The first lens element (front lens element) L1 is a negative lens element concave on both sides. Numeral s2 is an aspherical surface. The second lens element L2 is a positive meniscus lens element convex on the object side.

[1-1-2. Second Lens Unit]

The second lens unit (intermediate lens unit, the lens unit at the second place) GR2 includes: an optical aperture stop ST, a third lens element L3, a fourth lens element L4, a fifth lens element L5, and a sixth lens element L6. This second lens unit GR2 has, as a whole, a positive optical power.

The optical aperture stop ST is an aperture stop with a variable opening diameter, as is the case above. This optical aperture stop ST is integrally formed with the second lens unit GR2. In FIG. 17, this optical aperture stop ST itself is represented by s5 for convenience.

The third lens element L3 is a positive meniscus lens element convex on the object side. The fourth lens element L4 is a positive meniscus lens element convex on the object side. The fifth lens element L5 is a negative meniscus lens element convex on the object side. The fourth lens element L4 and the fifth lens element L5 compose a cemented lens element formed by cementing together s9 and s10.

The sixth lens element L6 is a negative meniscus lens element concave on the object side. Numerals s12 and s13 are aspherical surfaces.

[1-1-3. Third Lens Unit]

The third lens unit (image side lens unit, the lens unit at the third place) GR3 includes: a seventh lens element L7 only. The third lens unit GR3 (that is, the seventh lens element L7) has a positive optical power.

The seventh lens element L7 is a positive lens element convex on both sides. Numerals s14 and s15 are aspherical surfaces.

[1-1-4. Filter Unit]

The filter unit FU4 includes a low pass filter LF and a cover glass CG. This filter unit FU4 has, as a whole, no optical power. This filter unit FU4 is integrated with the image sensor SR and thus is represented as FU4+SR.

The low pass filter LF is a filter composed of two surfaces (s16, s17) and is an optical filter having a predetermined cutoff frequency characteristic determined by the pixel pitch of the image sensor SR.

The cover glass CG is a glass composed of two surfaces (s18, s19) that protect the light-receiving surface of the image sensor SR. Therefore, the surface s19 of the cover glass CG and the light-receiving surface of the image sensor SR are so disposed as to come extremely close to each other.

[1-2. Construction Data for the Variable Magnification Optical System (Example 3)]

Tables 9 and 10 show construction data for the variable magnification optical system 11 of Example 3 described above. Note that these Tables 9 and 10 are expressed in the same manner as Tables 1 and 2 descried above.

[1-3. Movement of Each Lens Unit in the Optical Unit]

[1-3-1. Zooming]

Now, the movement of each of the lens units and the like (GR1 to FU4) will be described with reference to FIG. 17. For convenience, in FIG. 17, only the axial surface distances (di) that vary during the zooming are numbered. More specifically, d4, d13, and d15 are shown in the figure.

When zooming from the wide-angle end position (W) to the telephoto end position (T) is performed, in the optical unit 1, the gap between the first lens unit GR1 and the second lens unit GR2 becomes smaller, the gap between the second lens unit GR2 and the third lens unit GR3 becomes larger, and the gap between the third lens unit GR3 and the filter unit FU4 (FU4+SR) becomes smaller.

More specifically, the optical unit 1 moves the first lens unit GR1, the third lens unit GR3, and the filter unit FU4 (FU4+SR) to the image side while not moving the second lens unit GR2 (while fixing it in position) to thereby achieve zooming.

Table 11 shows the amounts of movements of the lens units [GR1 to FU4 (FU4+SR)] during zooming. Note that this Table 11 is expressed in the same manner as Table 3 described above.

Figure 17:
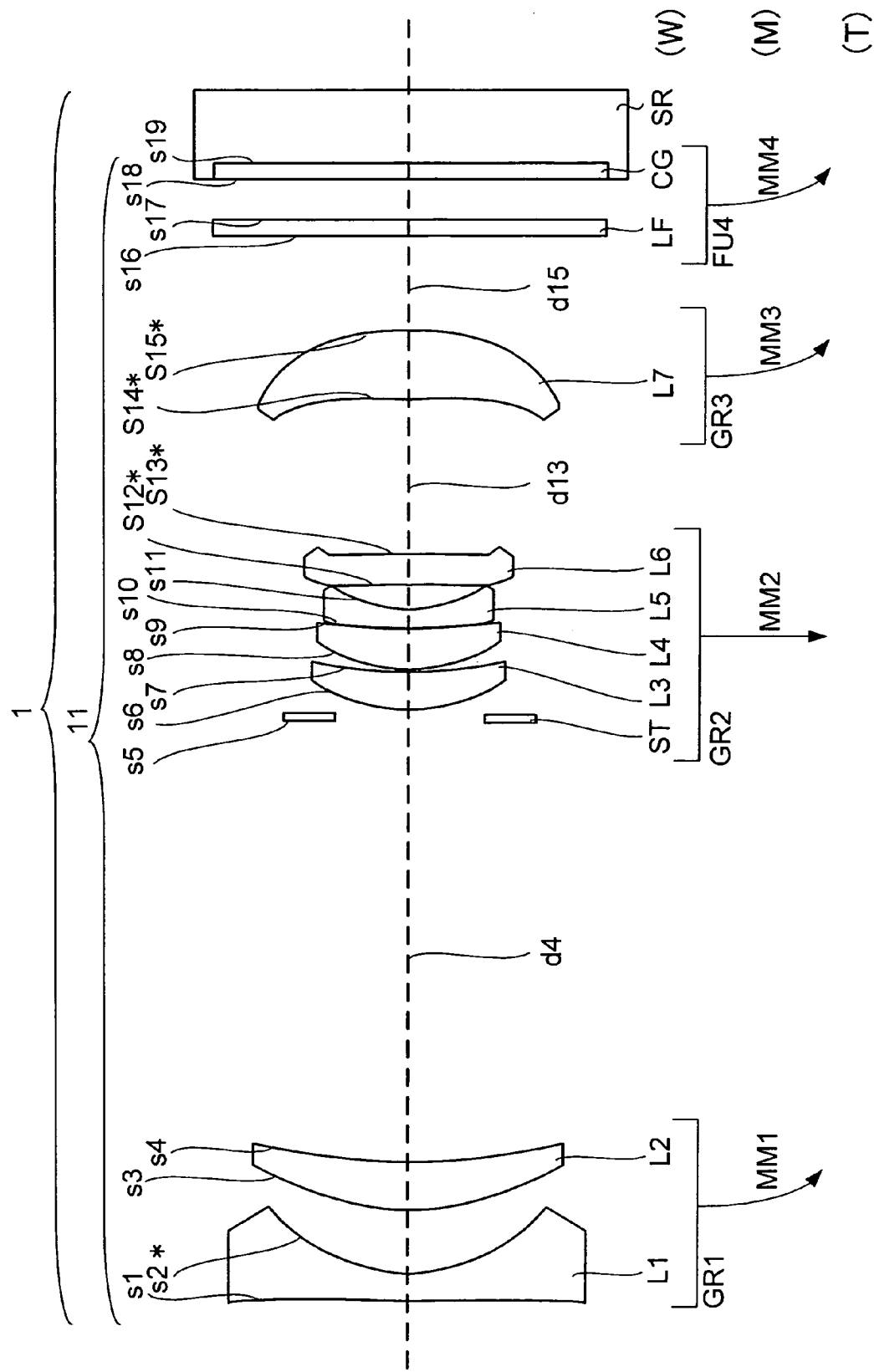
FIG. 17 is a lens construction diagram of a variable magnification optical system in an optical unit (Example 3)
Figure 18A:
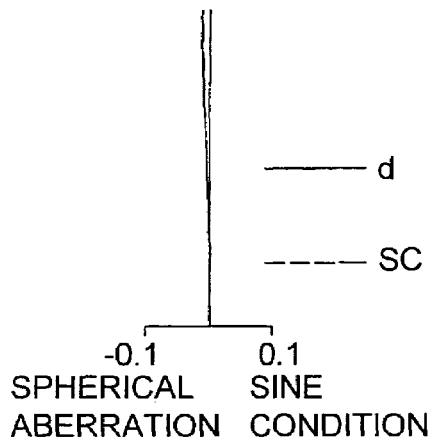
FIG. 18A is a spherical aberration diagram of the variable magnification optical system (Example 3) at the wide-angle end (W)
Figure 18B:
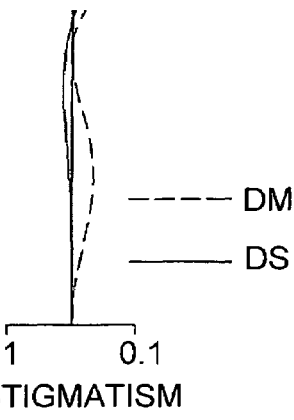
FIG. 18B is an astigmatism diagram of the variable magnification optical system (Example 3) at the wide-angle end (W)
Figure 18C:
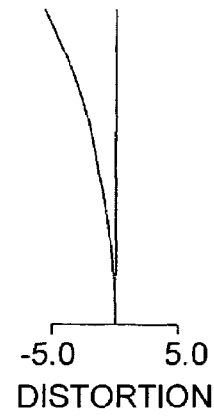
FIG. 18C is a distortion diagram of the variable magnification optical system (Example 3) at the wide-angle end (W)
Figure 19A:
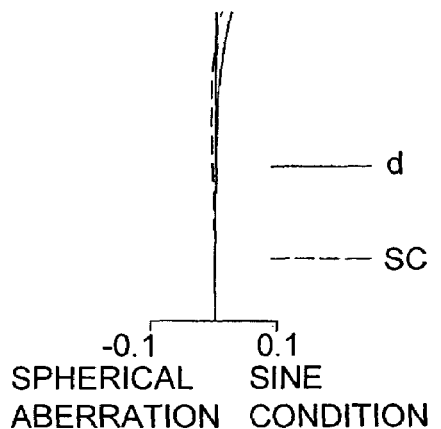
FIG. 19A is a spherical aberration diagram of the variable magnification optical system (Example 3) at the middle focal length (M)
Figure 19B:
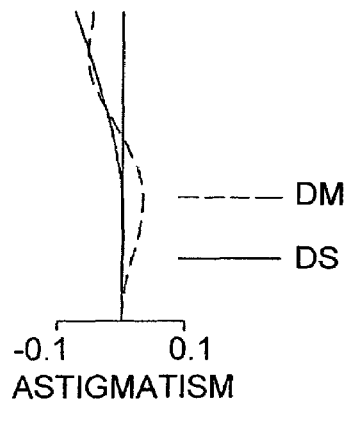
FIG. 19B is an astigmatism diagram of the variable magnification optical system (Example 3) at the middle focal length (M)
Figure 19C:
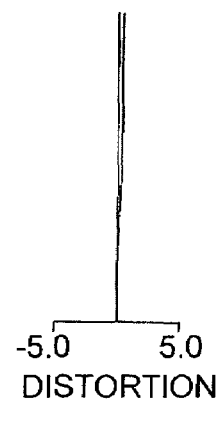
FIG. 19C is a distortion diagram of the variable magnification optical system (Example 3) at the middle focal length (M)
Figure 20A:
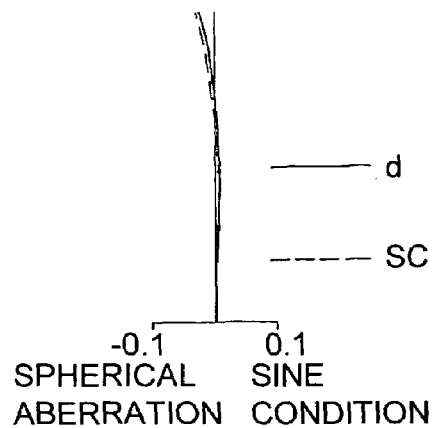
FIG. 20A is a spherical aberration diagram of the variable magnification optical system (Example 3) at the telephoto end (T)
Figure 20B:
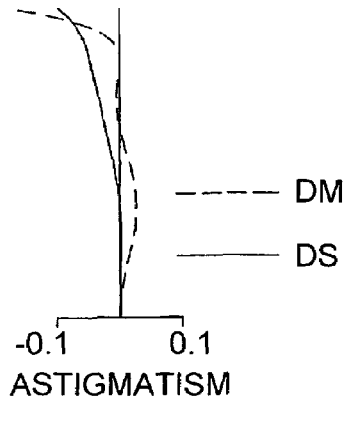
FIG. 20B is an astigmatism diagram of the variable magnification optical system (Example 3) at the telephoto end (T)
Figure 20C:
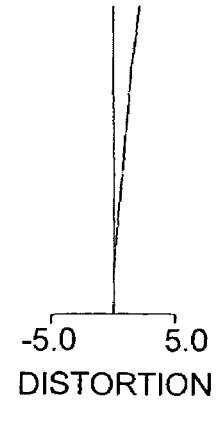
FIG. 20C is a distortion diagram of the variable magnification optical system (Example 3) at the telephoto end (T)

As can be seen from this Table 11 and FIG. 17, in the optical unit 1 including the variable magnification optical system 11 of Example 3, movable lens units are the first lens unit GR1, the third lens unit GR3, and the filter unit FU4 (FU4+SR).

FIGS. 18A to 18C, 19A to 19C, and 20A to 20C show aberrations occurring with the variable magnification optical system 11 in zooming. These FIGS. 18A to 18C, 19A to 19C, and 20A to 20C are expressed in the same manner as FIGS. 4A to 4C, 5A to 5C, and 6A to 6C.

[1-3-2. Focusing]

Next, focusing in the optical unit 1 will be described with reference to Table 12. This Table 12 is expressed in the same manner as Table 4 described above.

As shown in this Table 12, in focusing at any of the focal length positions, in the optical unit 1 of FIG. 17, the third lens unit GR3 and the filter unit FU4 (FU4+SR) move to the image side while the first lens unit GR1 and the second lens unit GR2 do not move.

FIGS. 21A to 21C, 22A to 22C, 23A to 23C show aberrations occurring with the variable magnification optical system 11 in focusing. These FIGS. 21A to 21C, 22A to 22C, 23A to 23C are expressed in the same manner as FIGS. 7A to 7C, 8A to 8C, and 9A to 9C.

[2. One Example of Various Features]

As described above, in the optical unit 1, the plurality of lens units include at least: in order from the object side, the first lens unit GR1 having a negative optical power, the second lens unit GR2 having a positive optical power, and the third lens unit GR3 having a positive optical power.

In zooming from the wide-angle end position (W) to the telephoto end position (T), at the telephoto end position (T) compared to the wide-angle end position (W), such an optical unit 1 decreases the gap between the first lens unit GR1 and the second lens unit GR2 and increases the gap between the second lens unit GR2 and the third lens unit GR3.

In such an optical unit 1, the first lens unit GR1 has a negative optical power, and the next second lens unit GR2 has a positive optical power. Accordingly, light from a subject to be photographed is first diverged by the first lens unit GR1. Subsequently, this diffused light is converged by the second lens unit GR2.

In this case, the gap between the first lens unit GR1 and the second lens unit GR2 becomes smaller. Accordingly, in the optical unit 1, the principal point (rear side principal point) of the variable magnification optical system 11 is located at a more rear side than the second lens unit GR2. Thus, in the previously specified full length of the optical unit 1, the focal length becomes relatively shorter. Therefore, the optical unit 1 can receive light with a wide angle of view.

The optical unit 1 decreases the gap between the first lens unit GR1 and the second lens unit GR2 and increases the gap between the second lens unit GR2 and the third lens unit GR3. Zooming with such gaps can be performed by either a movement of one lens unit (for example, the second lens unit GR2) or by movements of the plurality of lens units (for example, GR1 to GR3).

Accordingly, various movements of the lens units (for example, GR1 to GR3) for zooming can be assumed. Therefore, a relatively small number of lens units (for example, GR2) may be involved in zooming (involved in magnification variation), or a relatively large number of lens units (for example, GR1 to GR3) may be involved in zooming. Therefore, the optical unit 1 can improve the degree of freedom in the movements of the lens units.

The optical unit 1, although not shown, may decrease the gap between the first lens unit GR1 and the second lens unit GR2 and may decrease the gap between the second lens unit GR2 and the third lens unit GR3 at the telephoto end position (T) compared to the wide-angle end position (W).

This is because the optical unit 1 can receive light with a wide angle of view due to the decrease in the gap between the first lens unit GR1 and the second lens unit GR2. That is, even in zooming in which the gap between the first lens unit GR1 and the second lens unit GR2 becomes smaller and in which the gap between the second lens unit GR2 and the third lens unit GR3 becomes smaller, the optical unit 1 can achieve a wider angle of view and also can improve the degree of freedom in the movements of the lens units, as is the case above.

Moreover, the optical unit 1 in the third embodiment includes, as is the case with the first and second embodiments, the variable magnification optical system 11 including a plurality of lens units, and also includes the image sensor SR that receives light from a subject to be photographed via this variable magnification optical system 11.

In this optical unit 1, the second lens unit GR2 does not move in zooming. More specifically, of the plurality of lens units (GR1 to GR3), at least one of the lens units, i.e., the second lens unit GR2, other than the third lens unit GR3 closest to the image side is not moved. On the other hand, the third lens unit GR3 closest to the image side and the image sensor SR move along the optical axis AX.

That is, although different from the first and second embodiments in the order of optical power arrangement, the optical unit 1 of the third embodiment (see FIG. 17) is similar thereto in that it serves as an optical unit 1 in which the third lens unit GR3 closest to the image side and the image sensor SR moves. Thus, the optical unit 1 of the third embodiment provides the following effects of those effects provided by the optical units described in the first and second embodiments.

Based on the above, the optical unit 1 of the third embodiment provides at least the following effects described in the first embodiment.

In zooming, the image sensor SR moves, thus, for example, eliminating the need for projecting the second lens unit GR2 toward the subject to be photographed (the object side), which relatively reduces the diameter of the third lens element L3 and the like included in the second lens unit GR2.

In zooming, aberration correction is made with a plurality of movable bodies (the first lens unit GR1, the third lens unit GR3, the filter unit FU4 (FU4+SR)), thereby permitting more satisfactory aberration correction, compared to that achieved by moving only the image sensor SR.

In zooming, the movement of the image sensor SR in particular can efficiently correct aberration attributable to the first lens unit GR1 to the third lens unit GR3, thus improving the degree of freedom in designing the first lens unit GR1 to the third lens unit GR3 (for example, the degree of freedom in designing the curvature or the like).

The filter unit FU4 and the image sensor SR are integrated together, thus relatively reducing the variable magnification optical system 11 and thus the optical unit 1.

In focusing, the image sensor SR moves, thus eliminating the need for projecting the first lens unit GR1 and the like toward a subject to be photographed (the object side), which suppresses occurrence of aberration attributable to lens unit movements.

Other Embodiment

The present invention is not limited to the embodiments described above, and thus various modifications may be made without departing from the spirit of the invention.

For example, as an image capturing apparatus including an optical unit, a digital camera has been description above, although not limited thereto. The image capturing apparatuses include, for example, a video camera, a monitoring camera, an in-vehicle camera, a videophone camera, and a door phone camera.

Moreover, the image capturing apparatus may be incorporated in a personal computer, a mobile computer, a cellular phone, a personal digital assistant (PDA), other digital appliances, and the like.

Incorporation of the image capturing apparatus into such digital appliances provides the digital appliances with camera capability, thus permitting construction of a digital appliance with image input capability, such as a camera-equipped cellular phone or the like.

[Features from Different View Points]

As described above, the optical unit performs magnification variation by moving the image sensor and the image side lens unit. That is, this optical unit can perform magnification variation without moving, for example, the object side lens unit. Therefore, the optical unit can provide, for example, a lens element included in the object side lens unit with a relatively downsized diameter (front lens diameter or the like). Moreover, the optical unit moves the image side lens unit, thus permitting efficient aberration correction. Consequently, the optical unit and the image capturing apparatus including this optical unit lens can provide a relatively downsized diameter and also can perform satisfactory aberration correction.

It can also be said that the optical system capable of zooming and the image capturing apparatus including this optical system as described above has the following features.

For example, in terms of aberration correction, the image side lens unit of the optical unit may include a lens element having an aspherical surface. With such a structure, the optical unit can perform efficient aberration correction.

In magnification variation, the image side lens unit and the image sensor of the optical unit may move integrally. For example, the integration of the image side lens unit and the image sensor in order to achieve such construction no longer requires a drive source dedicated for the image side lens unit or a movement drive source dedicated for the image sensor.

The close contact and integration between the image side lens unit and the image sensor result in a relatively smaller gap between the image side lens unit and the image sensor, thus further downsizing the optical unit. Moreover, the relatively smaller gap resists contamination of a foreign substance (dust) or the like.

It is also preferable that the immovable lens unit of the optical unit include an optical aperture stop or a shutter, because such construction no longer requires a drive source or a moving mechanism for moving the optical aperture stop or the shutter, thus downsizing the optical unit.

In the optical unit, the plurality of lens units may include at least: in order from the object side, the first lens unit having a positive optical power, the second lens unit having a negative optical power, the third lens unit having a positive optical power, and the fourth lens unit having a positive optical power.

In magnification variation from the wide-angle end position to the telephoto end position by such a optical unit, at the telephoto end compared to at the wide-angle end, the gap between the first lens unit and the second lens unit becomes larger, the gap between the second lens unit and the third lens unit becomes smaller, and the gap between the third lens unit and the fourth lens unit becomes larger.

That is, in the optical unit, the gap between the object side lens unit and the second lens unit becomes larger. Accordingly, the composite focal length of the image side lens unit and the second lens unit becomes shorter than the focal length of the variable magnification optical system 11 (the focal length of the entire system). Further, the second lens unit suppresses the light convergence before the light that has passed through the image side lens unit is focused, thus shifting the focusing point toward the image sensor side. Accordingly, in the previously specified full length of the optical unit, the focal length becomes relatively longer. Thus, the optical unit has a relatively high magnification (relatively high magnification variation).

Moreover, in the optical unit, the plurality of lens units may include at least: in order from the object side, the first lens unit having a negative optical power, the second lens unit having a positive optical power, and the third lens unit having a positive optical power.

In magnification variation from the wide-angle end position to the telephoto end position by such a optical unit, at the telephoto end compared to at the wide-angle end, the gap between the first lens unit and the second lens unit becomes smaller, and the gap between the second lens unit and the third lens unit becomes larger or smaller.

That is, in the optical unit, the object side lens unit has a negative optical power, and the next lens unit (second lens unit) has a positive optical power. Accordingly, light from a subject to be photographed is divered by the object side lens unit. Subsequently, this diffused light is diverged by the second lens unit.

In this case, the gap between the object side lens unit and the second lens unit becomes smaller. Accordingly, in the optical unit, the principal point (rear side principal point) of the variable magnification optical system is located at a more rear side than the second lens unit. Thus, in the previously specified full length of the optical unit, the focal length becomes relatively shorter, thus permitting the optical unit to receive light with a wide angle of view.

Moreover, the image capturing apparatus including the optical unit as described above can perform satisfactory aberration correction while remaining compact. In addition, the image capturing apparatus can be provided with a higher magnification and a wider angle.

The detailed embodiments, the examples, and the like in the description above just clarify the details of art provided by the present invention. Therefore, it should be noted that the present invention is not limited to the detailed examples and thus is not to be interpreted in a narrow sense, so that various modifications may be made within the scope of the appended claims.

TABLE 1

| | Focal Length Position | | | (W)~(M)~(T) | | | |
|---|---|---|---|---|---|---|---|
| | F[mm] | | | 7.98~19.17~45.18 | | | |
| Example 1 | FNO | | | 3.40~4.52~5.78 | | | |
| i | ri[mm] | i | di[mm] | i | Ni | vi | Element |
| 1 | 50.290 | 1 | 0.800 | 1 | 1.92286 | 20.88 | L1 |
| 2 | 23.049 | 2 | 2.300 | | | | |
| 3 | ∞ | 3 | 11.400 | 2 | 1.88300 | 40.79 | PR |
| 4 | ∞ | 4 | 0.100 | | | | GR1 |
| 5 | 39.492 | 5 | 1.825 | 3 | 1.62299 | 58.12 | L2 |
| 6 | -51.788 | 6 | 0.100 | | | | |
| 7 | 15.124 | 7 | 1.855 | 4 | 1.49700 | 81.61 | L3 |
| 8 | 79.041 | 8 | 0.601~6.314~11.006 | | | | |
| 9 | 62.108 | | | | | | |
| 10 | 6.391 * | 9 | 0.800 | 5 | 1.77250 | 49.77 | L4 |
| 11 | -7.501 | 10 | 2.024 | | | | |
| 12 | 10.339 | 11 | 0.700 | 6 | 1.58913 | 61.25 | L5 | GR2 |
| 13 | 10.339 | 12 | 0.010 | 7 | 1.51400 | 42.83 | |
| 14 | -47.554 | 13 | 1.511 | 8 | 1.84660 | 23.78 | L6 |
| 15 | ∞ | 14 | 11.355~5.642~0.950 | | | | ST |
| 16 | 16.369 * | 15 | 1.000 | | | | |
| 17 | -7.996 | 16 | 4.810 | 9 | 1.69350 | 53.39 | L7 |
| 18 | -7.996 | 17 | 0.010 | 10 | 1.51400 | 42.83 | |
| 19 | -16.577 | 18 | 0.700 | 11 | 1.84666 | 23.78 | L8 | GR3 |
| 20 | ∞ | 19 | 0.100 | | | | |
| 21 | ∞ | 20 | 10.000 | | | | MR |
| 22 | 27.523 | 21 | 1.689 | | | | |
| 23 | -42.954 | 22 | 2.018 | 12 | 1.49700 | 81.61 | L9 |
| 24 | -13.982 | 23 | 3.500 | | | | |
| 25 | 35.715 | 24 | 0.700 | 13 | 1.84666 | 23.78 | L10 |
| 26 | 11.744 | 25 | 0.641 | | | | |
| 27 | 31.014 * | 26 | 2.500 | 14 | 1.81359 | 25.73 | L11 |
| 28 | 38.595 * | 27 | 1.020~9.213~18.485 | | | | |
| 29 | -17.832 * | 28 | 2.447 | 15 | 1.53048 | 55.72 | L12 |
| 30 | ∞ | 29 | 0.432 | | | | |
| 31 | ∞ | 30 | 0.500 | 16 | 1.51680 | 64.20 | LF | GR4 |
| 32 | ∞ | 31 | 2.000 | | | | |
| 33 | ∞ | 32 | 0.500 | 17 | 1.51680 | 64.20 | CG |

TABLE 2

Example 1

Aspherical Surface Data
of Surface 10(i = 10)

| $\epsilon$ | 1.0000 |
|---|---|
| A4 | −0.71259357E−06 |
| A6 | −0.96542695E−05 |
| A8 | 0.14551445E−05 |
| A10 | −0.45506399E−07 |

TABLE 2-continued

Example 1

Aspherical Surface Data
of Surface 16(i = 16)

| $\epsilon$ | 1.0000 |
|---|---|
| A4 | −0.76551995E−04 |
| A6 | −0.15120307E−05 |
| A8 | 0.19558910E−06 |
| A10 | −0.64952426E−08 |

Aspherical Surface Data
of Surface 27(i = 27)

| $\epsilon$ | 1.0000 |
|---|---|
| A4 | 0.94322697E−04 |
| A6 | 0.79638893E−05 |
| A8 | −0.46161190E−06 |
| A10 | 0.98832020E−08 |

Aspherical Surface Data
of Surface 28(i = 28)

| $\epsilon$ | 1.0000 |
|---|---|
| A4 | −0.35458126E−03 |
| A6 | 0.47035870E−04 |
| A8 | −0.28202467E−05 |
| A10 | 0.39484035E−07 |

Aspherical Surface Data
of Surface 29(i = 29)

| $\epsilon$ | 1.0000 |
|---|---|
| A4 | 0.21104642E−03 |
| A6 | 0.49241586E−04 |
| A8 | −0.35707683E−05 |
| A10 | 0.53790285E−07 |

TABLE 3

Example 1
Amount of Movement in Zooming

| Focal Length Position | TL [mm] | GR1 [mm] | GR2 [mm] | GR3 [mm] | (GR4 + SR) [mm] |
|---|---|---|---|---|---|
| W | 70.447 | 0.0000 | 0.0000 | 0.0000 | 0.0000 |
| M | 78.640 | 0.0000 | +5.7128 | 0.0000 | +8.1938 |
| T | 87.905 | 0.0000 | +10.4049 | 0.0000 | +17.4654 |

TABLE 4

Example1
Amount of Movement in Focusing

| | Shortest Photographing Distance [m] | TL [mm] | GR1 [mm] | GR2 [mm] | GR3 [mm] | (GR4 + SR) [mm] |
|---|---|---|---|---|---|---|
| W | 0.2 | 70.888 | 0.0000 | 0.0000 | 0.0000 | +0.4391 |
| M | 0.9 | 79.237 | 0.0000 | 0.0000 | 0.0000 | +0.6014 |
| T | 0.9 | 91.396 | 0.0000 | 0.0000 | 0.0000 | +3.5313 |

TABLE 5

| Example 2 | Focal Length Position | | | (W)~(M)~(T) | | |
|---|---|---|---|---|---|---|
| | F[mm] | | | 7.31~22.51~69.42 | | |
| | FNO | | | 2.82~3.67~4.35 | | |
| i | ri[mm] | i | di[mm] | i | Ni | vi | Element |
|---|---|---|---|---|---|---|---|
| 1 | 57.202 | 1 | 2.200 | 1 | 1.84666 | 23.78 | L1 |
| 2 | 40.644 | 2 | 0.010 | 2 | 1.51400 | 42.83 | |
| 3 | 40.644 | 3 | 5.574 | 3 | 1.48749 | 70.44 | L2 | GR1 |
| 4 | 825.887 | 4 | 0.200 | | | | |
| 5 | 43.731 | 5 | 3.784 | 4 | 1.48749 | 70.44 | L3 |
| 6 | 166.298 | 6 | 1.258~21.245~38.737 | | | | |
| 7 | 83.211 | 7 | 1.350 | 5 | 1.69680 | 55.46 | L4 |
| 8 | 10.256 | 8 | 6.834 | | | | |
| 9 | −43.174 | | | | | | |
| 10 | −19.662 * | 9 | 2.365 | 6 | 1.84666 | 23.78 | L5 |
| 11 | −19.662 | 10 | 0.010 | 7 | 1.51400 | 42.83 | |
| 12 | 62.150 | 11 | 0.700 | 8 | 1.69680 | 55.46 | L6 | GR2 |
| 13 | 16.932 | 12 | 1.000 | | | | |
| 14 | 24.142 | 13 | 0.264 | 9 | 1.84666 | 23.78 | L7 |
| 15 | −100.000 | 14 | 2.148 | | | | |
| | | 15 | 1.000 | 10 | 1.80420 | 46.50 | L8 |
| 16 | 2436.588 * | 16 | 31.586~12.415~1.504 | | | | |
| 17 | ∞ | 17 | 1.200 | | | | ST |
| 18 | 20.777 | 18 | 1.548 | 11 | 1.77250 | 49.62 | L9 |
| 19 | −354.877 | 19 | 0.100 | | | | | GR3 |
| 20 | 11.526 | 20 | 4.912 | 12 | 1.49700 | 81.61 | L10 |
| 21 | 240.878 | 21 | 0.010 | 13 | 1.51400 | 42.83 | |
| 22 | 240.878 | 22 | 3.134 | 14 | 1.72825 | 28.32 | L11 |
| 23 | 8.167 | 23 | 2.241 | | | | |
| 24 | 10.604 | 24 | 1.500 | 15 | 1.58913 | 61.11 | L12 |
| 25 | 52.890 | 25 | 2.062~10.214~16.810 | | | | |
| 26 | −16.831 | 26 | 2.350 | 16 | 1.80518 | 25.46 | L13 |
| 27 | −21.855 * | 27 | 2.547 | | | | |
| 28 | −17.812 * | 28 | 2.445 | 17 | 1.52200 | 52.20 | L14 |
| 29 | −8.721 * | 29 | 3.361 | | | | | GR4 |
| 30 | ∞ | 30 | 2.446 | 18 | 1.54426 | 69.60 | PT |
| 31 | ∞ | 31 | 0.500 | | | | |
| 32 | ∞ | 32 | 0.500 | 19 | 1.51680 | 64.20 | CG |
| 33 | ∞ | | | | | | |

TABLE 6

Example 2

Aspherical Surface Data
of Surface 25(i = 25)

| ε | 1.0000 |
|---|---|
| A4 | 0.12057811E−03 |
| A6 | 0.75866837E−06 |
| A8 | −0.22333248E−07 |
| A10 | 0.66698701E−09 |

TABLE 6-continued

Example 2

Aspherical Surface Data
of Surface 28(i = 28)

| ε | 1.0000 |
|---|---|
| A4 | −0.53036857E−03 |
| A6 | 0.81363177E−05 |
| A8 | −0.73046171E−06 |
| A10 | 0.10437975E−07 |

Aspherical Surface Data
of Surface 29(i = 29)

| ε | 1.0000 |
|---|---|
| A4 | −0.18000410E−03 |
| A6 | 0.64223396E−05 |
| A8 | −0.41570064E−06 |
| A10 | 0.50837348E−08 |

TABLE 7

Example 2
Amount of Movement in Zooming

| Focal Length Position | TL [mm] | GR1 [mm] | GR2 [mm] | GR3 [mm] | (GR4 + SR) [mm] |
|---|---|---|---|---|---|
| W | 97.000 | 0.0000 | 0.0000 | 0.0000 | 0.0000 |
| M | 105.968 | 0.0000 | +19.9865 | +0.8152 | +8.9680 |
| T | 119.144 | 0.0000 | +37.4786 | +7.3968 | +22.1443 |

TABLE 8

Example 2
Amount of Movement in Focusing

| | Shortest Photographing Distance [m] | TL [mm] | GR1 [mm] | GR2 [mm] | GR3 [mm] | (GR4 + SR) [mm] |
|---|---|---|---|---|---|---|
| W | 0.1 | 97.569 | 0.0000 | 0.0000 | 0.0000 | +0.5682 |
| M | 0.5 | 107.180 | 0.0000 | 0.0000 | 0.0000 | +1.2185 |
| T | 1.0 | 125.334 | 0.0000 | 0.0000 | 0.0000 | +6.1898 |

TABLE 9

| Example 3 | Focal Length Position | | | (W)~(M)~(T) | | |
|---|---|---|---|---|---|---|
| | F[mm] | | | 6.83~11.51~19.39 | | |
| | FNO | | | 2.70~3.66~5.08 | | |
| i | ri[mm] | i | di[mm] | i | Ni | vi | Element |
|---|---|---|---|---|---|---|---|
| 1 | −192.210 | 1 | 1.000 | 1 | 1.77250 | 49.77 | L1 |
| 2 | 6.800 * | 2 | 2.489 | | | | |
| 3 | 12.500 | 3 | 1.849 | 2 | 1.84666 | 23.78 | L2 | GR1 |
| 4 | 33.477 | 4 | 16.971~9.543~4.113 | | | | |
| 5 | ∞ | 5 | 0.300 | | | | ST |
| 6 | 7.826 | 6 | 1.434 | 3 | 1.88300 | 40.79 | L3 |
| 7 | 19.504 | 7 | 0.080 | | | | |
| 8 | 6.990 | 8 | 1.586 | 4 | 1.69680 | 55.46 | L4 | GR2 |
| 9 | 49.528 | | | | | | |

TABLE 9-continued

| | | | | | | | |
|---|---|---|---|---|---|---|---|
| 10 | 49.528 | 9 | 0.010 | 5 | 1.51400 | 42.83 | |
| 11 | 5.819 | 10 | 0.700 | 6 | 1.84666 | 23.78 | L5 |
| 12 | -40.810* | 11 | 0.959 | | | | |
| 13 | -19.187* | 12 | 1.100 | 7 | 1.53048 | 55.72 | L6 |
| 14 | 545.230* | 13 | 5.732~13.397~22.988 | | | | |
| 15 | -11.117* | 14 | 2.503 | 8 | 1.53048 | 55.72 | L7 | GR3 |
| 16 | ∞ | 15 | 3.536~2.051~1.400 | | | | |
| 17 | ∞ | 16 | 0.500 | 9 | 1.51680 | 64.20 | LF | FU4 |
| 18 | ∞ | 17 | 1.500 | | | | |
| 19 | ∞ | 18 | 0.500 | 10 | 1.51680 | 64.20 | CG | |

TABLE 10

Example 3

Aspherical Surface Data of Surface 2(i = 2)

| | |
|---|---|
| ε | 0.2295 |
| A4 | -0.71181204E-06 |
| A6 | -0.29030785E-05 |
| A8 | 0.17499480E-06 |
| A10 | -0.54806717E-08 |
| A12 | 0.66387147E-010 |

Aspherical Surface Data of Surface 12(i = 12)

| | |
|---|---|
| ε | 1.0000 |
| A4 | -0.53665558E-03 |
| A6 | 0.87274194E-04 |
| A8 | 0.36396483E-05 |
| A10 | -0.14117115E-06 |

Aspherical Surface Data of Surface 13(i = 13)

| | |
|---|---|
| ε | 1.0000 |
| A4 | 0.56354383E-03 |
| A6 | 0.10378227E-03 |
| A8 | 0.39273485E-05 |
| A10 | 0.15854891E-07 |

Aspherical Surface Data of Surface 14(i = 14)

| | |
|---|---|
| ε | 1.0000 |
| A4 | -0.72146758E-03 |
| A6 | 0.25679390E-04 |
| A8 | -0.23789748E-05 |
| A10 | 0.37968002E-07 |

Aspherical Surface Data of Surface 15(i = 15)

| | |
|---|---|
| ε | 1.0000 |
| A4 | -0.34936492E-03 |
| A6 | 0.16850830E-04 |
| A8 | -0.15828920E-05 |
| A10 | 0.23547144E-07 |

TABLE 11

Example 3
Amount of Movement in Zooming

| Focal Length Position | TL [mm] | GR1 [mm] | GR2 [mm] | GR3 [mm] | (FU4 + SR) [mm] |
|---|---|---|---|---|---|
| W | 43.738 | 0.0000 | 0.0000 | 0.0000 | 0.0000 |
| M | 42.490 | +7.4272 | 0.0000 | +7.6652 | +6.1798 |
| T | 46.000 | +12.8575 | 0.0000 | +17.2558 | +15.1200 |

TABLE 12

Example 3
Amount of Movement in Focusing

| Shortest Photographing Distance [m] | TL [mm] | GR1 [mm] | GR2 [mm] | GR3 [mm] | (FU4 + SR) [mm] |
|---|---|---|---|---|---|
| W | 0.2 | 44.248 | 0.0000 | 0.0000 | +0.5142 | +0.5142 |
| M | 0.2 | 43.669 | 0.0000 | 0.0000 | +1.1467 | +1.1467 |
| T | 0.2 | 49.100 | 0.0000 | 0.0000 | +2.7666 | +2.7666 |

What is claimed is:

1. An optical unit comprising:
a variable magnification optical system including a plurality of lens units having at least the object side lens unit closest to an object side and the image side lens unit closest to an image side, and
an image sensor for receiving light that has passed through the variable magnification optical system, and
a magnification variation structure in which, while, of the plurality of lens units, at least one of the lens units other than the image side lens unit is not moved, the image side lens unit and the image sensor are moved along an optical axis to thereby perform magnification variation.

2. The optical unit of claim 1,
wherein the image side lens unit and the image sensor move integrally.

3. The optical unit of claim 1,
wherein the image side lens unit includes a lens element having an aspherical surface.

4. The optical unit of claim 1,
wherein the immovable lens unit includes either one of an optical aperture stop and a shutter.

5. The optical unit of claim 1,
wherein the plurality of lens units include at least: in order from the object side,
a first lens unit having a positive optical power,
a second lens unit having a negative optical power,
a third lens unit having a positive optical power, and
a fourth lens unit having a positive optical power,
wherein, in magnification variation from a wide-angle end to a telephoto end, a gap between the first lens unit and the second lens unit becomes larger, a gap between the second lens unit and the third lens unit becomes smaller, and a gap between the third lens unit and the fourth lens unit becomes larger.

6. The optical unit of claim 1,
wherein the plurality of lens units include at least: in order from the object side,
a first lens unit having a negative optical power,
a second lens unit having a positive optical power, and
a third lens unit having a positive optical power, wherein, in magnification variation from a wide-angle end to a telephoto end, a gap between the first lens unit and the second lens unit becomes smaller, and a gap between the second lens unit and the third lens unit becomes larger or smaller.

7. An image capturing apparatus comprising:
an optical unit comprising:
- a variable magnification optical system including a plurality of lens units having at least the object side lens unit closest to an object side and the image side lens unit closest to an image side;
- an image sensor for receiving light that has passed through the variable magnification optical system; and
- a magnification variation structure in which, while, of the plurality of lens units, at least one of the lens units other than the image side lens unit is not moved, the image side lens unit and the image sensor are moved along an optical axis to thereby perform magnification variation, and a controller which drives the magnification variation structure to thereby move the image side lens unit and the image sensor along the optical axis.

8. The image capturing apparatus of claim 7, wherein the image side lens unit and the image sensor move integrally.

9. The image capturing apparatus of claim 7, wherein the image side lens unit includes a lens element having an aspherical surface.

10. The image capturing apparatus of claim 7, wherein the immovable lens unit includes either one of an optical aperture stop and a shutter.

11. The image capturing apparatus of claim 7, wherein the plurality of lens units include at least: in order from the object side,
- a first lens unit having a positive optical power,
- a second lens unit having a negative optical power,
- a third lens unit having a positive optical power, and
- a fourth lens unit having a positive optical power, wherein, in magnification variation from a wide-angle end to a telephoto end, a gap between the first lens unit and the second lens unit becomes larger, a gap between the second lens unit and the third lens unit becomes smaller, and a gap between the third lens unit and the fourth lens unit becomes larger.

12. The image capturing apparatus of claim 7, wherein the plurality of lens units include at least: in order from the object side,
- a first lens unit having a negative optical power,
- a second lens unit having a positive optical power, and
- a third lens unit having a positive optical power, wherein, in magnification variation from a wide-angle end to a telephoto end, a gap between the first lens unit and the second lens unit becomes smaller, and a gap between the second lens unit and the third lens unit becomes larger or smaller.

* * * * *

UNITED STATES PATENT AND TRADEMARK OFFICE
CERTIFICATE OF CORRECTION

PATENT NO. : 7,573,647 B2  Page 1 of 1
APPLICATION NO. : 11/435634
DATED : August 11, 2009
INVENTOR(S) : Matsumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this

Fourteenth Day of December, 2010

David J. Kappos
*Director of the United States Patent and Trademark Office*